United States Patent
Chou et al.

(10) Patent No.: US 12,370,764 B2
(45) Date of Patent: Jul. 29, 2025

(54) VEHICLE-MOUNTED AIR COMPRESSOR

(71) Applicant: UNIK WORLD INDUSTRIAL CO., LTD., Tainan (TW)

(72) Inventors: Wen San Chou, Tainan (TW); Cheng Hsien Chou, Tainan (TW)

(73) Assignee: UNIK WORLD INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 18/614,766

(22) Filed: Mar. 25, 2024

(65) Prior Publication Data

US 2025/0128679 A1    Apr. 24, 2025

Related U.S. Application Data

(60) Provisional application No. 63/592,553, filed on Oct. 23, 2023.

(30) Foreign Application Priority Data

Feb. 22, 2024    (TW) .................................. 113106360

(51) Int. Cl.
*B29C 73/16*    (2006.01)
*B60S 5/04*    (2006.01)

(52) U.S. Cl.
CPC .............. *B29C 73/166* (2013.01); *B60S 5/04* (2013.01)

(58) Field of Classification Search
CPC ............................ B29C 73/166; B65D 83/40
See application file for complete search history.

(56) References Cited

U.S. PATENT DOCUMENTS

| | | | |
|---|---|---|---|
| 8,978,717 B2 * | 3/2015 | Nakao | B29C 73/166 141/38 |
| 11,034,104 B2 * | 6/2021 | Dowel | B29C 73/166 |
| 2003/0024596 A1 * | 2/2003 | Kojima | B65D 47/36 141/38 |
| 2003/0056851 A1 * | 3/2003 | Eriksen | B29C 73/166 141/105 |
| 2013/0092286 A1 | 4/2013 | Chou | |

(Continued)

FOREIGN PATENT DOCUMENTS

| | | |
|---|---|---|
| CN | 102791470 | 11/2012 |
| CN | 209569133 | 11/2019 |
| CN | 209582360 | 11/2019 |

(Continued)

*Primary Examiner* — Timothy P. Kelly
(74) *Attorney, Agent, or Firm* — JCIPRNET

(57) ABSTRACT

A vehicle-mounted air compressor includes an air compressor main body and a bottle cap assembly including bottle cap and sealing and flow guiding components. The bottle cap component is at the air compressor main body, has air inlet/outlet openings, and connected to the air compressor main body via the air inlet opening. The sealing and flow guiding component is at the bottle cap component and includes sealing and flow guiding portions, the former surrounding the latter, and the latter covering the air inlet opening and having at least one air inlet hole and an air outlet hole and connected to the air inlet opening via the air inlet hole and connected to the air outlet opening via the air outlet hole. An airflow from the air compressor main body passes through the air inlet opening, the air inlet hole, the air outlet hole, and the air outlet opening in sequence.

18 Claims, 23 Drawing Sheets

(56) References Cited

U.S. PATENT DOCUMENTS

2018/0272631 A1  9/2018  Zaum et al.

FOREIGN PATENT DOCUMENTS

| | | |
|---|---|---|
| DE | 102013114853 | 6/2015 |
| DE | 102019217775 | 5/2021 |
| JP | 2010184354 | 8/2010 |
| JP | 2011131547 | 7/2011 |
| JP | 2012188109 | 10/2012 |
| JP | 2017056662 | 3/2017 |
| JP | 2023526050 | 6/2023 |
| TW | I813367 | 8/2023 |
| TW | M657520 | 7/2024 |
| WO | 2013047419 | 4/2013 |

\* cited by examiner

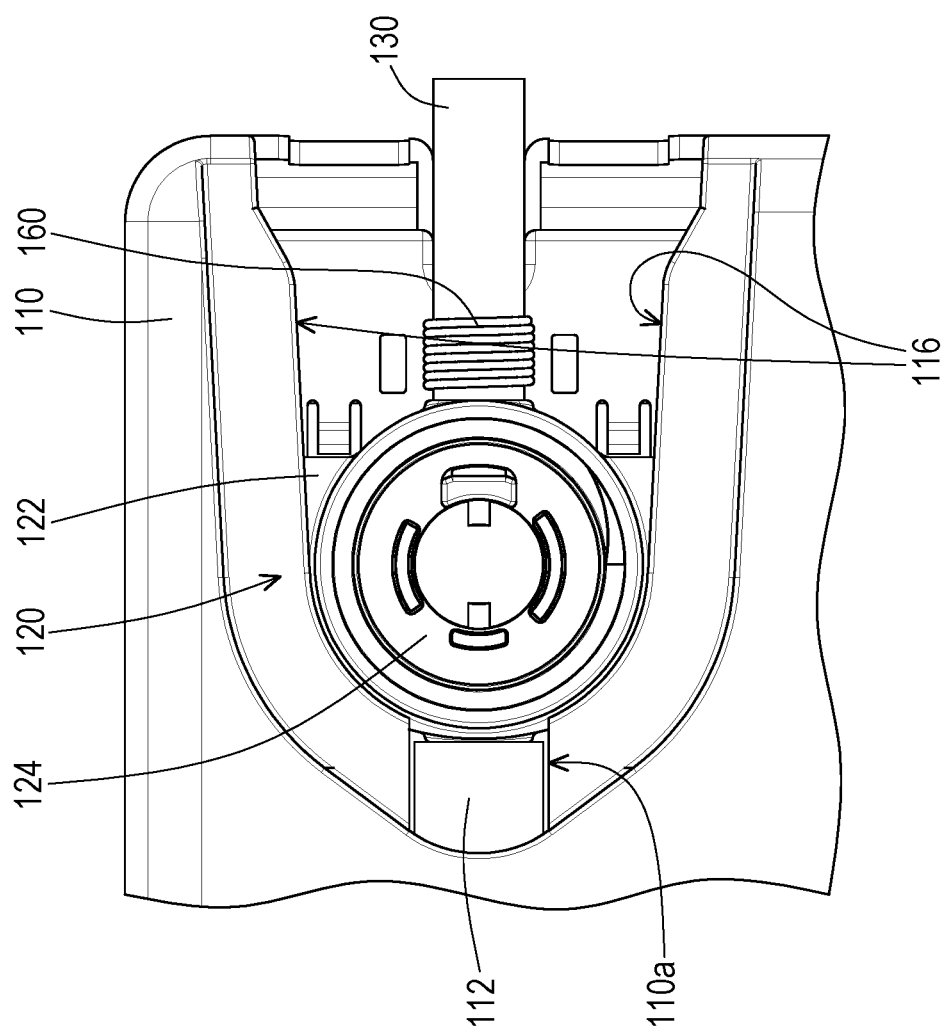

VEHICLE-MOUNTED AIR COMPRESSOR

CROSS-REFERENCE TO RELATED APPLICATION

This application claims the priority benefit of U.S. Provisional Application No. 63/592,553, filed on Oct. 23, 2023 and Taiwan Application No. 113106360, filed on Feb. 22, 2024. The entirety of each of the above-mentioned patent applications is hereby incorporated by reference herein and made a part of this specification.

BACKGROUND OF THE INVENTION

Field of the Invention

The invention relates to an air compressor, and in particular to a vehicle-mounted air compressor.

Description of Related Art

A vehicle-mounted air compressor may be used with a tire sealant holding bottle to repair and inflate the vehicle's tires, and may also be used to inflate the vehicle's tires without a tire sealant holding bottle. In general, when performing a tire repair and inflation operation, the air compressor main body of the vehicle-mounted air compressor needs to be equipped with a bottle cap assembly to combine with the tire sealant holding bottle, and the high-pressure airflow from the air compressor main body passes through the bottle cap assembly and enters the tire sealant holding bottle, and then the high-pressure airflow drives the tire sealant in the tire sealant holding bottle to enter the tire to achieve the effect of tire repair and inflation.

If the tire sealant in the tire sealant holding bottle accidentally flows into the air compressor main body via the bottle cap assembly, the air compressor main body may not operate properly. In order to avoid the above situation, additional parts are added to the bottle cap assembly to prevent the tire sealant from flowing to the air compressor main body, and therefore the number of parts and the difficulty of manufacturing and assembling the bottle cap assembly are increased.

SUMMARY OF THE INVENTION

The invention provides a vehicle-mounted air compressor and a bottle cap assembly thereof that prevent the tire sealant from flowing to the air compressor main body via a simple structure.

A vehicle-mounted air compressor of the invention includes an air compressor main body and a bottle cap assembly. The bottle cap assembly includes a bottle cap component and a sealing and flow guiding component. The bottle cap component is mounted at the air compressor main body and has an air inlet opening and an air outlet opening, and the bottle cap component is connected to the air compressor main body via the air inlet opening. The sealing and flow guiding component is disposed at the bottle cap component and includes a sealing portion and a flow guiding portion. The sealing portion surrounds the flow guiding portion, and the flow guiding portion covers the air inlet opening and has at least one air inlet hole and an air outlet hole. The flow guiding portion is connected to the air inlet opening via the air inlet hole and connected to the air outlet opening via the air outlet hole. An airflow from the air compressor main body is adapted to pass through the air inlet opening, the air inlet hole, the air outlet hole, and the air outlet opening in sequence.

A bottle cap assembly of the invention is adapted for a vehicle-mounted air compressor and includes a bottle cap component and a sealing guide component. The bottle cap component is mounted at an air compressor main body of the vehicle-mounted air compressor and has an air inlet opening and an air outlet opening, and the bottle cap component is connected to the air compressor main body via the air inlet opening. The sealing and flow guiding component is disposed at the bottle cap component and includes a sealing portion and a flow guiding portion. The sealing portion surrounds the flow guiding portion. The flow guiding portion covers the air inlet opening and has at least one air inlet hole and an air outlet hole. The flow guiding portion is connected to the air inlet opening via the air inlet hole and connected to the air outlet opening via the air outlet hole. An airflow from the air compressor main body is adapted to pass through the air inlet opening, the air inlet hole, the air outlet hole, and the air outlet opening in sequence.

In an embodiment of the invention, the sealing portion and the flow guiding portion are integrally formed structures.

In an embodiment of the invention, a flow guiding channel is formed between the sealing and flow guiding component and the bottle cap component, and the flow guiding channel is connected between the at least one air inlet hole and the air outlet hole.

In an embodiment of the invention, a width of the flow guiding channel is less than an inner diameter of the air inlet opening and an inner diameter of at least one air inlet hole.

In an embodiment of the invention, the flow guiding channel is extended in a zigzag manner.

In an embodiment of the invention, the flow guiding portion includes a boss, the at least one air inlet hole is located at a top end of the boss, and a bottom end of the boss is adjacent to the air outlet hole and the sealing portion.

In an embodiment of the invention, the sealing and flow guiding component has at least one positioning slot, the bottle cap component has at least one positioning rib, and the at least one positioning rib passes through the at least one positioning slot to prevent the sealing and flow guiding component from rotating relative to the bottle cap component.

In an embodiment of the invention, the bottle cap component is adapted to engage with a bottleneck of a tire sealant holding bottle, so that the sealing portion is compressed between the bottle cap component and the bottleneck of the tire sealant holding bottle, and the air inlet hole and the air outlet hole are connected to an internal space of the tire sealant holding bottle.

In an embodiment of the invention, the bottle cap component has at least one cutting edge rib, and the at least one cutting edge rib is adapted to cut a sealing film on the bottleneck of the tire sealant holding bottle.

In an embodiment of the invention, the vehicle-mounted air compressor further includes a limiting component and at least one fastening component, wherein the limiting component limits the bottle cap component to the air compressor main body, and the at least one fastening component fastens the limiting component to the air compressor main body.

In an embodiment of the invention, the air compressor main body has an air outlet pipe, the air outlet pipe is connected to the bottle cap component to be connected to the air inlet opening, there is an opening at a top surface of the air compressor main body, and a connection point between the air outlet pipe and the bottle cap component corresponds to the opening.

Based on the above, in the vehicle-mounted air compressor of the invention, in addition to providing the existing sealing function via the sealing portion thereof, the sealing and flow guiding component also covers the air inlet opening of the bottle cap component via the flow guiding portion thereof. Accordingly, while the high-pressure airflow from the air compressor main body flows smoothly to the air outlet opening of the bottle cap component via the guidance of the flow guiding portion, the flow guiding portion may prevent the tire sealant in the tire sealant holding bottle from flowing to the air inlet opening of the bottle cap component. That is, in the invention, the flow guiding portion is integrally formed on the existing sealing component to cover the air inlet opening of the bottle cap component, so no additional parts are needed to achieve this object. Therefore, the vehicle-mounted air compressor and the bottle cap assembly thereof of the invention prevent the tire sealant from flowing to the air compressor main body via a simple structure, thereby reducing the difficulty of manufacturing and assembling the bottle cap assembly.

BRIEF DESCRIPTION OF THE DRAWINGS

FIG. 13A to FIG. 13C are top views of the vehicle-mounted air compressor of FIG. 12A to FIG. 12C respectively.

DESCRIPTION OF THE EMBODIMENTS

Figure 1:
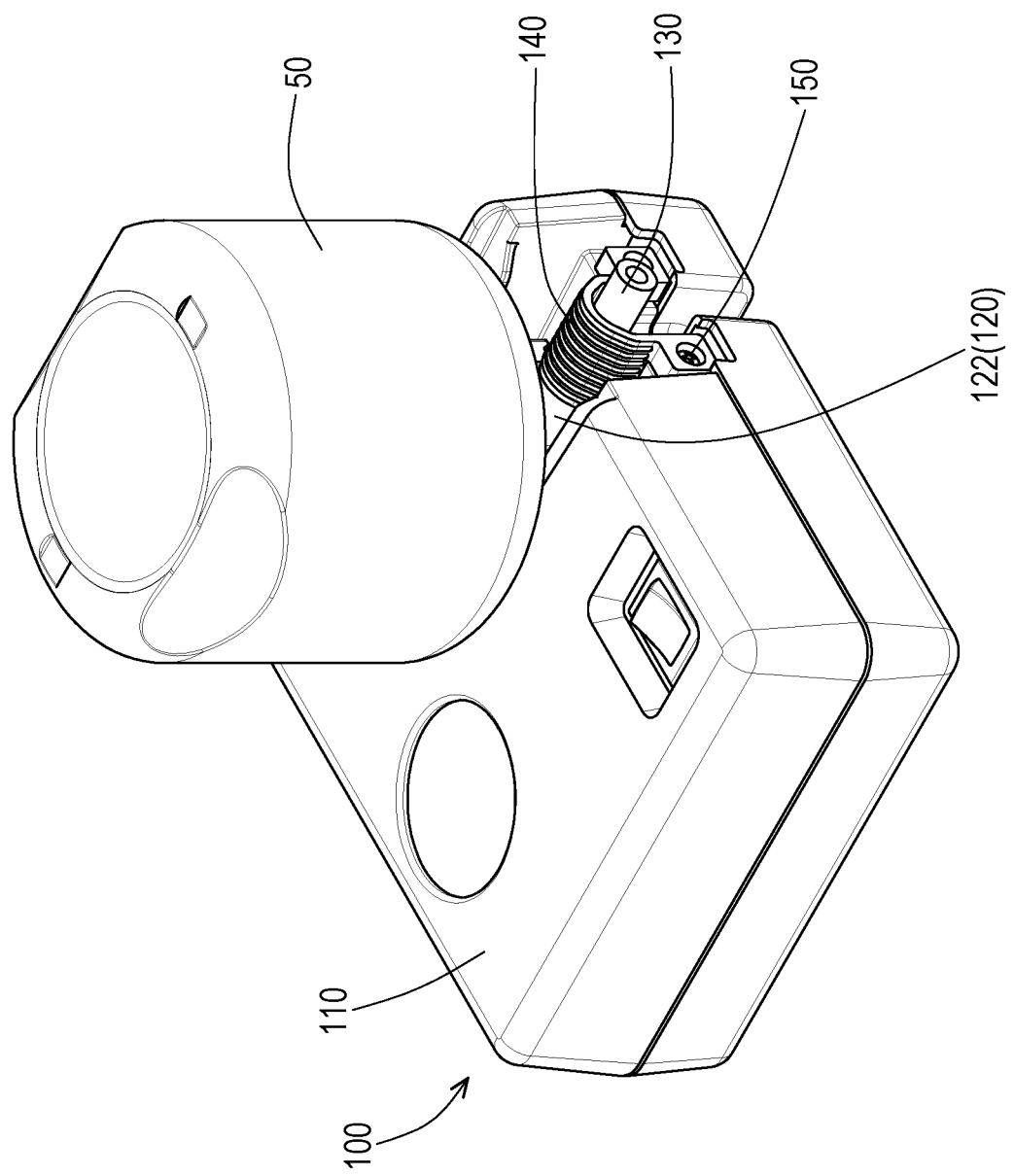
FIG. 1 is a three-dimensional view of a vehicle-mounted air compressor and a tire sealant holding bottle of an embodiment of the invention.
Figure 2:
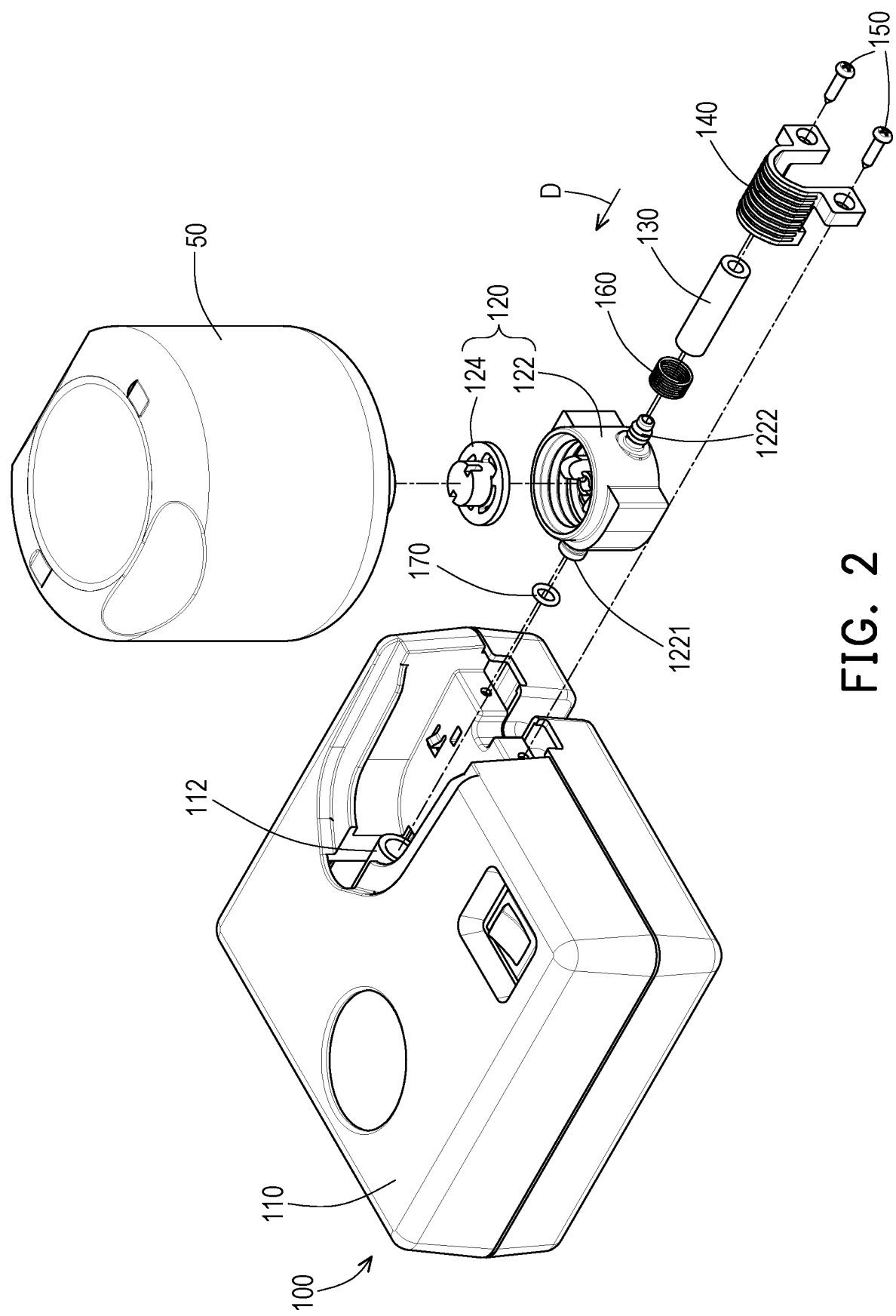
FIG. 2 is an exploded view of the vehicle-mounted air compressor and the tire sealant holding bottle of FIG. 1.
Figure 3:
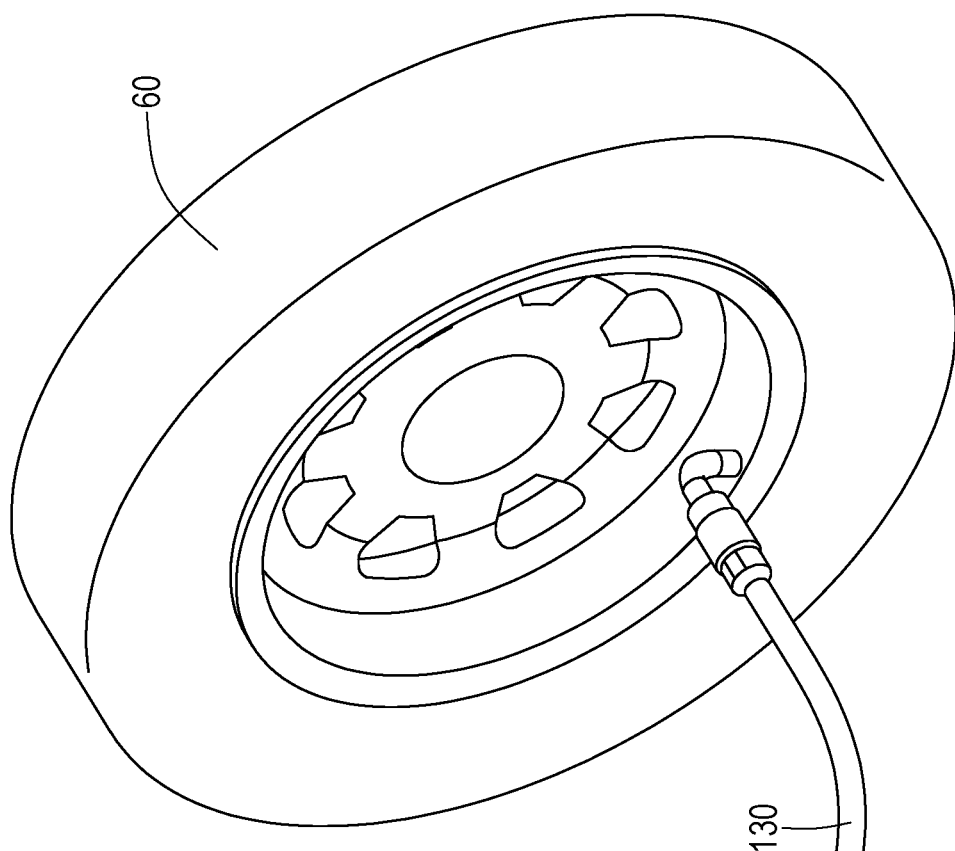
FIG. 3 is a three-dimensional view of the vehicle-mounted air compressor of FIG. 1 connected to a tire.

FIG. 1 is a three-dimensional view of a vehicle-mounted air compressor and a tire sealant holding bottle of an embodiment of the invention. FIG. 2 is an exploded view of the vehicle-mounted air compressor and the tire sealant holding bottle of FIG. 1. FIG. 3 is a three-dimensional view of the vehicle-mounted air compressor of FIG. 1 connected to a tire. Please refer to FIG. 1 to FIG. 3. A vehicle-mounted air compressor 100 of the present embodiment includes an air compressor main body 110, a bottle cap assembly 120, and a connecting pipe 130. The bottle cap assembly 120 includes a bottle cap component 122 and a sealing and flow guiding component 124. The bottle cap component 122 is mounted at the air compressor main body 110 and has an air inlet end 1221 and an air outlet end 1222. The air inlet end 1221 and the air outlet end 1222 are, for example, cylindrical bodies protruded outward from the outer surface of the bottle cap component 122. The air inlet end 1221 is adapted to be plugged into an air outlet pipe 112 of the air compressor main body 110. The sealing and flow guiding component 124 is made of, for example, rubber, silicone, or other types of elastic sealing materials and is disposed at the bottle cap component 122. The tire sealant holding bottle 50 is used to be engaged with the bottle cap component 122. The bottle cap component 122 may be connected to a tire 60 via the connecting pipe 130.

The high-pressure airflow from the air compressor main body 110 is adapted to enter the bottle cap component 122 via the air inlet end 1221 of the bottle cap component 122 and pass through the bottle cap component 122 and the sealing and flow guiding component 124 in sequence to reach the tire sealant holding bottle 50. Then, the tire sealant in the tire sealant holding bottle 50 is driven via the high-pressure airflow to pass through the sealing and flow guiding component 124 and the bottle cap component 122 in sequence and leave the bottle cap component 122 via the air outlet end 1222 of the bottle cap component 122 and flow to the tire 60 through the connecting pipe 130 to achieve the effect of tire repair and inflation. The method and principle by which the air compressor main body 110 generates high-pressure airflow are known in the technical field and are not described in detail here.

Figure 4:
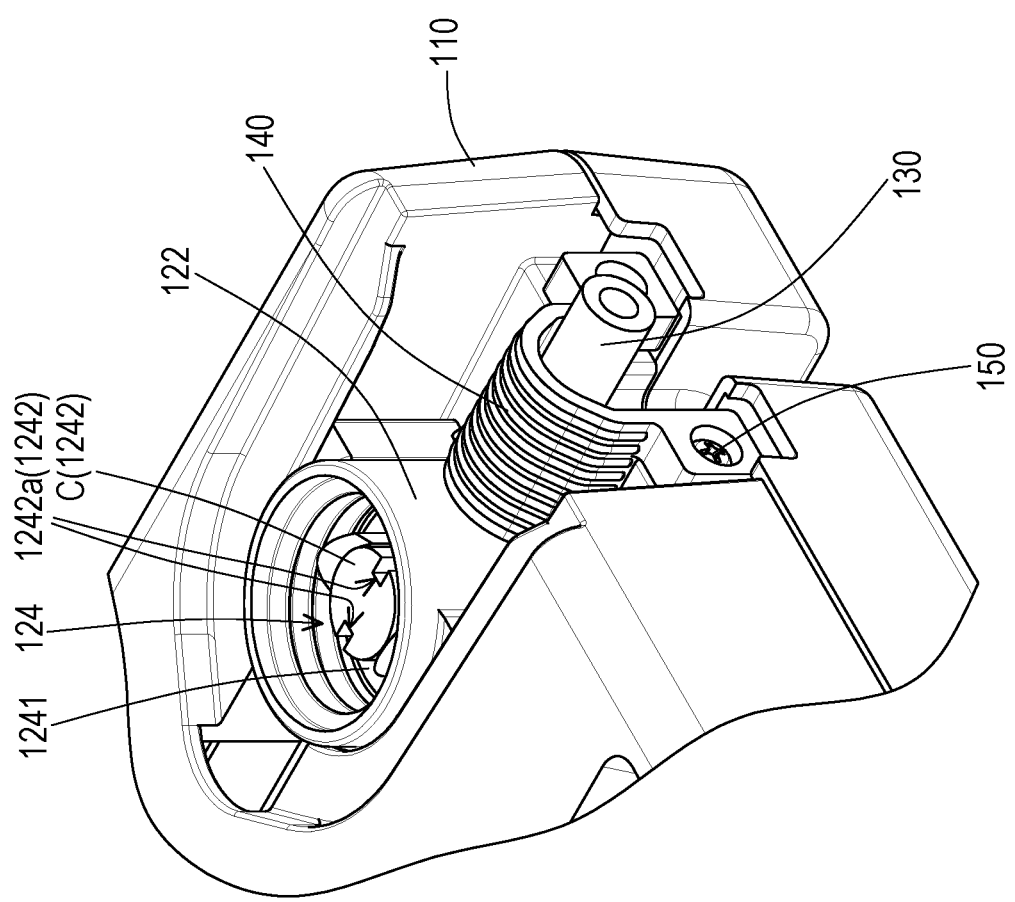
FIG. 4 is a partial three-dimensional view of the vehicle-mounted air compressor of FIG. 1.
Figure 5:
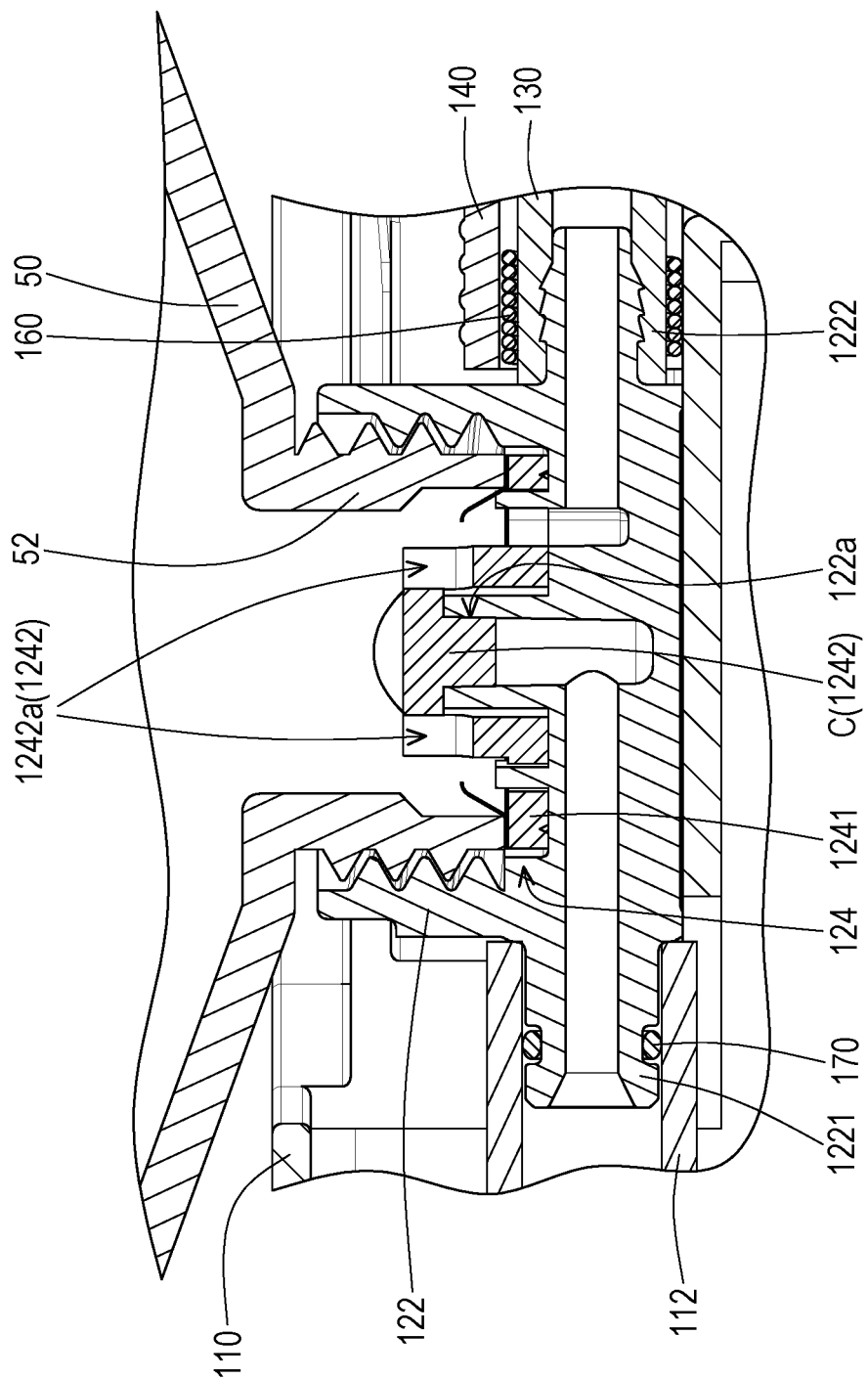
FIG. 5 is a partial cross-sectional view of the vehicle-mounted air compressor and the tire sealant holding bottle of FIG. 1.

FIG. 4 is a partial three-dimensional view of the vehicle-mounted air compressor of FIG. 1. FIG. 5 is a partial cross-sectional view of the vehicle-mounted air compressor and the tire sealant holding bottle of FIG. 1. Please refer to FIG. 4 and FIG. 5. Specifically, the sealing and flow guiding component 124 is located in the bottle cap component 122 and includes a sealing portion 1241 and a flow guiding portion 1242. The sealing portion 1241 surrounds the flow guiding portion 1242, and the flow guiding portion 1242 is connected between the air inlet end 1221 and the air outlet end 1222. The sealing portion 1241 and the flow guiding portion 1242 are integrally formed structures. That is, the sealing and flow guiding portion 124 is an integrally formed single member rather than being formed by multiple parts. When the bottleneck 52 of the tire sealant holding bottle 50 is engaged with the bottle cap component 122, the bottleneck 52 of the tire sealant holding bottle 50 presses down the sealing portion 1241 of the sealing and flow guiding component 124, so that the sealing portion 1241 is compressed between the bottle cap component 122 and the bottleneck 52 of the tire sealant holding bottle 50 to prevent the tire sealant in the tire sealant holding bottle 50 from flowing out via the gap between the bottleneck 52 and the bottle cap component 122.

Figure 6:
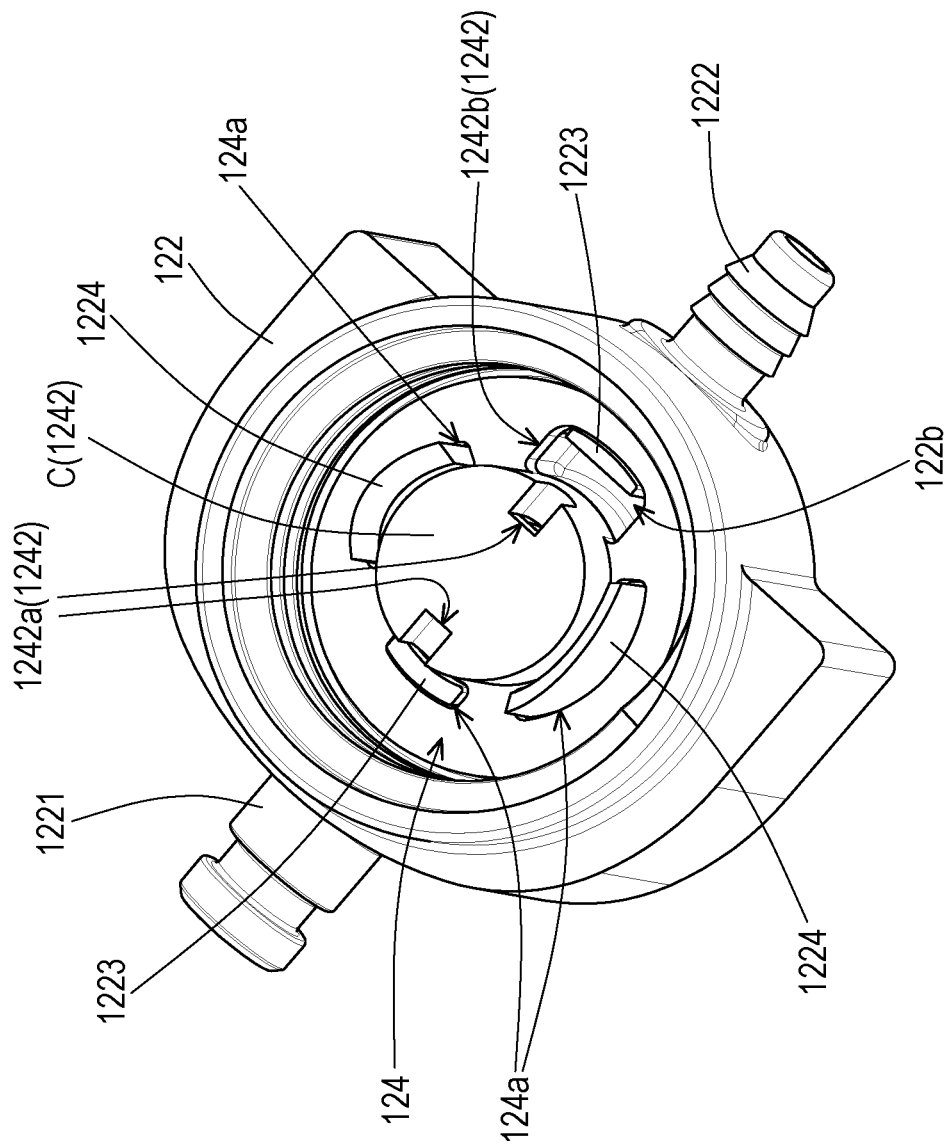
FIG. 6 is a three-dimensional view of the bottle cap component and the sealing and flow guiding component of FIG. 2.
Figure 7:
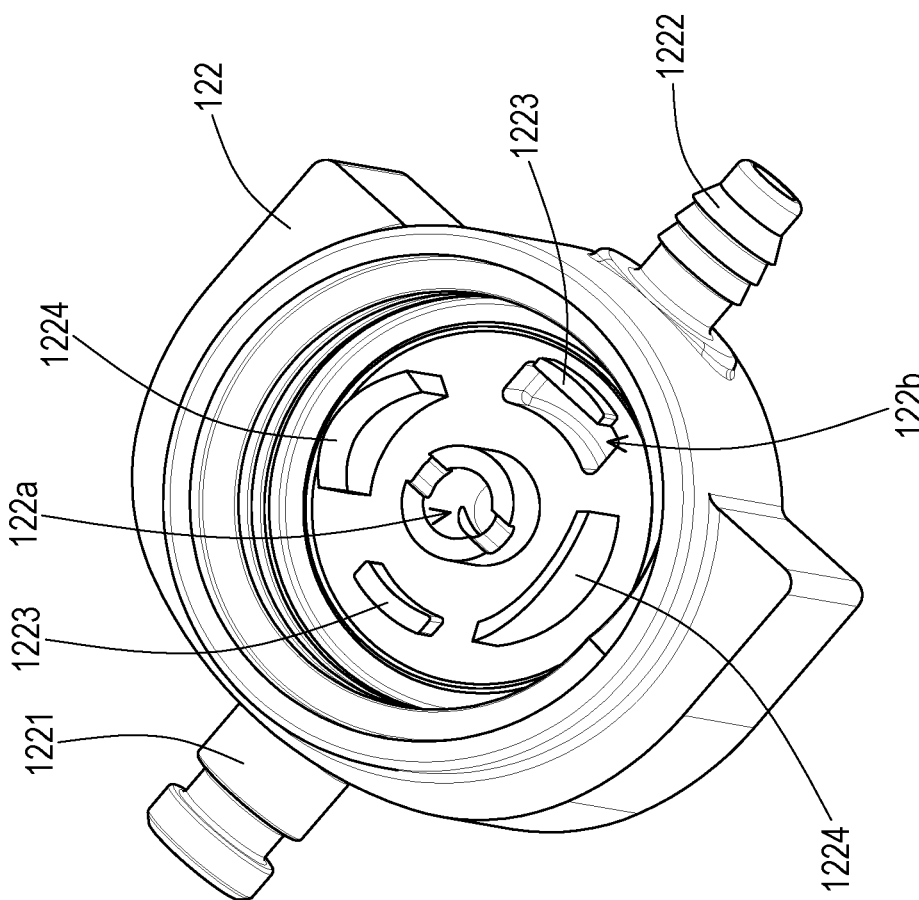
FIG. 7 is a three-dimensional view of the bottle cap component of FIG. 6.
Figure 8:
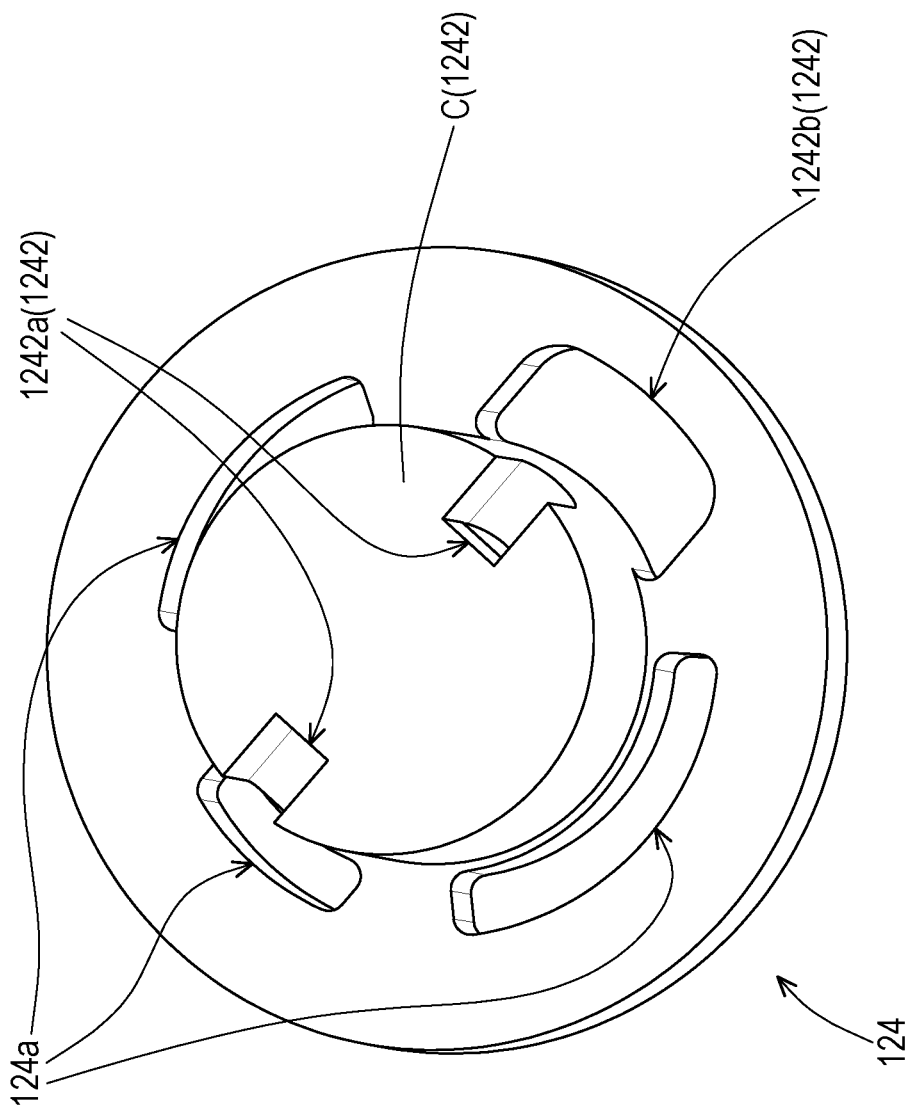
FIG. 8 is a three-dimensional view of the sealing and flow guiding component of FIG. 6.

FIG. 6 is a three-dimensional view of the bottle cap component and the sealing and flow guiding component of FIG. 2. FIG. 7 is a three-dimensional view of the bottle cap component of FIG. 6. FIG. 8 is a three-dimensional view of the sealing and flow guiding component of FIG. 6. Please refer to FIG. 6 to FIG. 8, specifically, the bottle cap component 122 of the present embodiment has an air inlet opening 122*a* and an air outlet opening 122*b*. The air inlet opening 122*a* is connected to the air inlet end 1221, and the air outlet opening 122*b* is connected to the air outlet end 1222. Therefore, the inside of the bottle cap component 122 may be connected to the air compressor main body 110 via the air inlet opening 122*a* and may be connected to the connecting pipe 130 via the air outlet opening 122*b*. Moreover, the air guiding portion 1242 covers the air inlet opening 122*a* and has at least one air inlet hole 1242*a* (two are shown) and an air outlet hole 1242*b*. The flow guiding portion 1242 is connected to the air inlet opening 122*a* via the air inlet hole 1242*a* and connected to the air outlet opening 122*b* via the air outlet hole 1242*b*. When the bottle cap component 122 and the bottleneck 52 of the tire sealant holding bottle 50 are engaged with each other as shown in FIG. 5, the air inlet hole 1242*a* and the air outlet hole 1242*b* of the flow guiding portion 1242 are connected to the internal space of the tire sealant holding bottle 50. The high-pressure airflow from the air compressor main body 110 is adapted to pass through the air inlet opening 122*a*, the air inlet hole 1242*a*, the internal space of the tire sealant holding bottle 50, the air outlet hole 1242*b*, and the air outlet opening 122*b* in sequence.

Under the above arrangement, the sealing and flow guiding component 124 not only provides the existing sealing function with the sealing portion 1241 thereof, but also covers the air inlet opening 122*a* of the bottle cap component 122 via the flow guiding portion 1242 thereof. Accordingly, while the high-pressure airflow from the air compressor main body 110 flows smoothly to the air outlet opening 122*b* of the bottle cap component 122 via the guidance of the flow guiding portion 1242, the flow guiding portion 1242 may prevent the tire sealant in the tire sealant holding bottle 50 from flowing to the air inlet opening 122*a* of the bottle cap component 122. That is, in the present embodiment, the flow guiding portion 1242 is integrally formed on the existing sealing component to cover the air inlet opening 122*a* of the bottle cap component 122, so no additional parts are needed to achieve this object. Therefore, the vehicle-mounted air compressor 100 and the bottle cap assembly 120 thereof of the present embodiment prevent the tire sealant from flowing to the air compressor main body 110 via a simple structure, thereby reducing the difficulty of manufacturing and assembling the bottle cap assembly 120.

Figure 9:
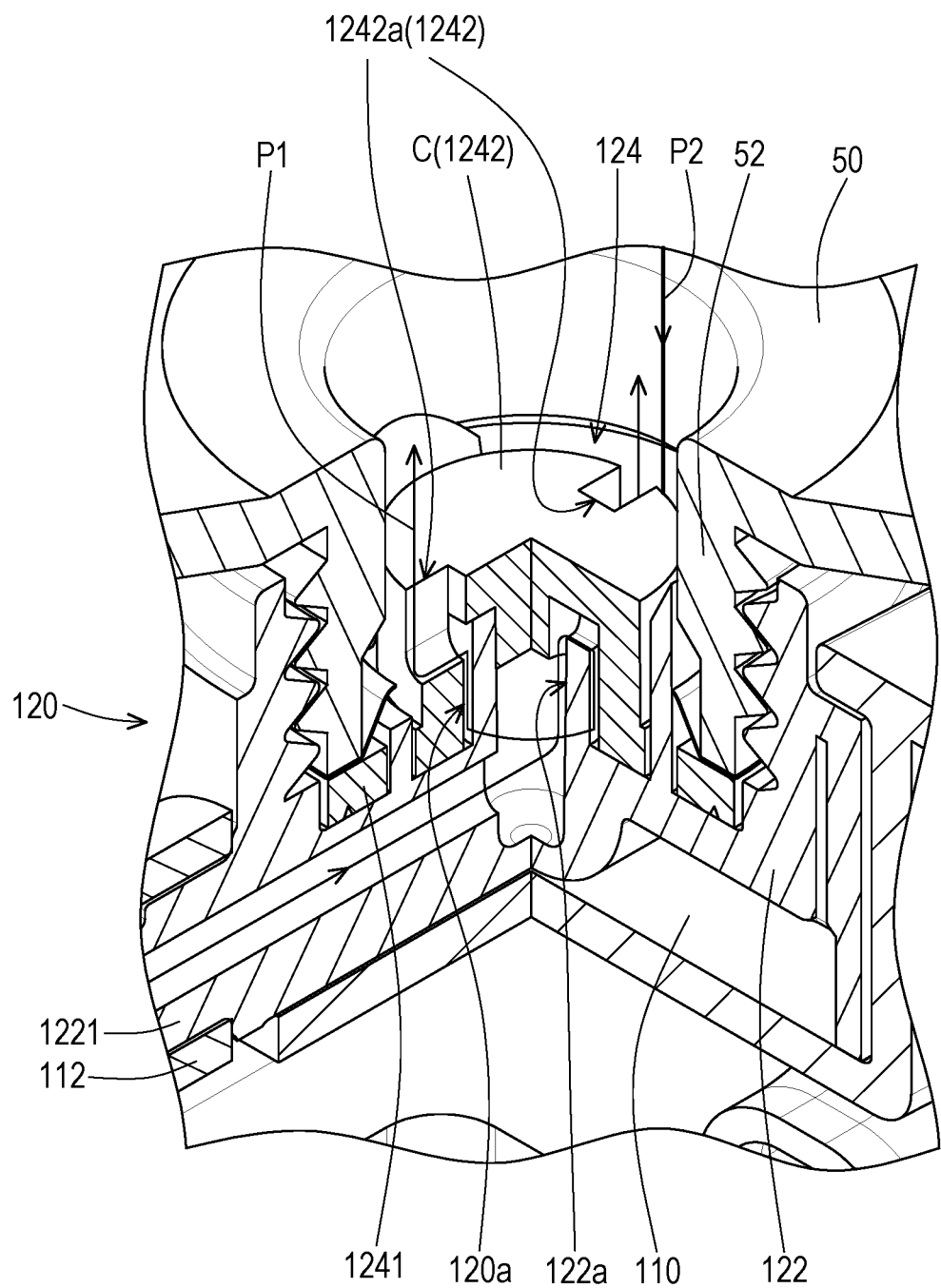
FIG. 9 shows the partial structure of the vehicle-mounted air compressor and the tire sealant holding bottle of FIG. 1.
Figure 10:
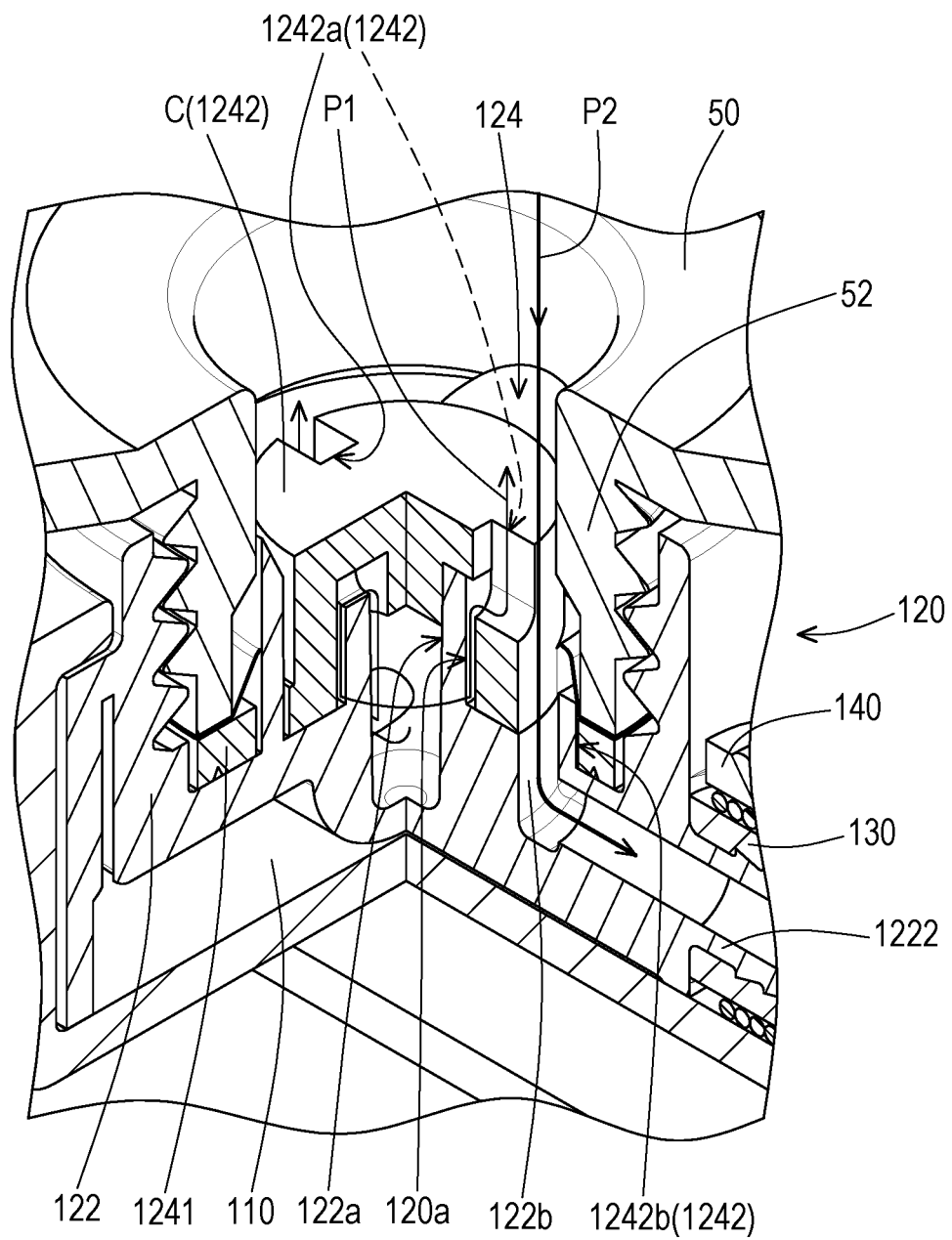
FIG. 10 shows the partial structure of the vehicle-mounted air compressor and the tire sealant holding bottle of FIG. 1.
Figure 11:
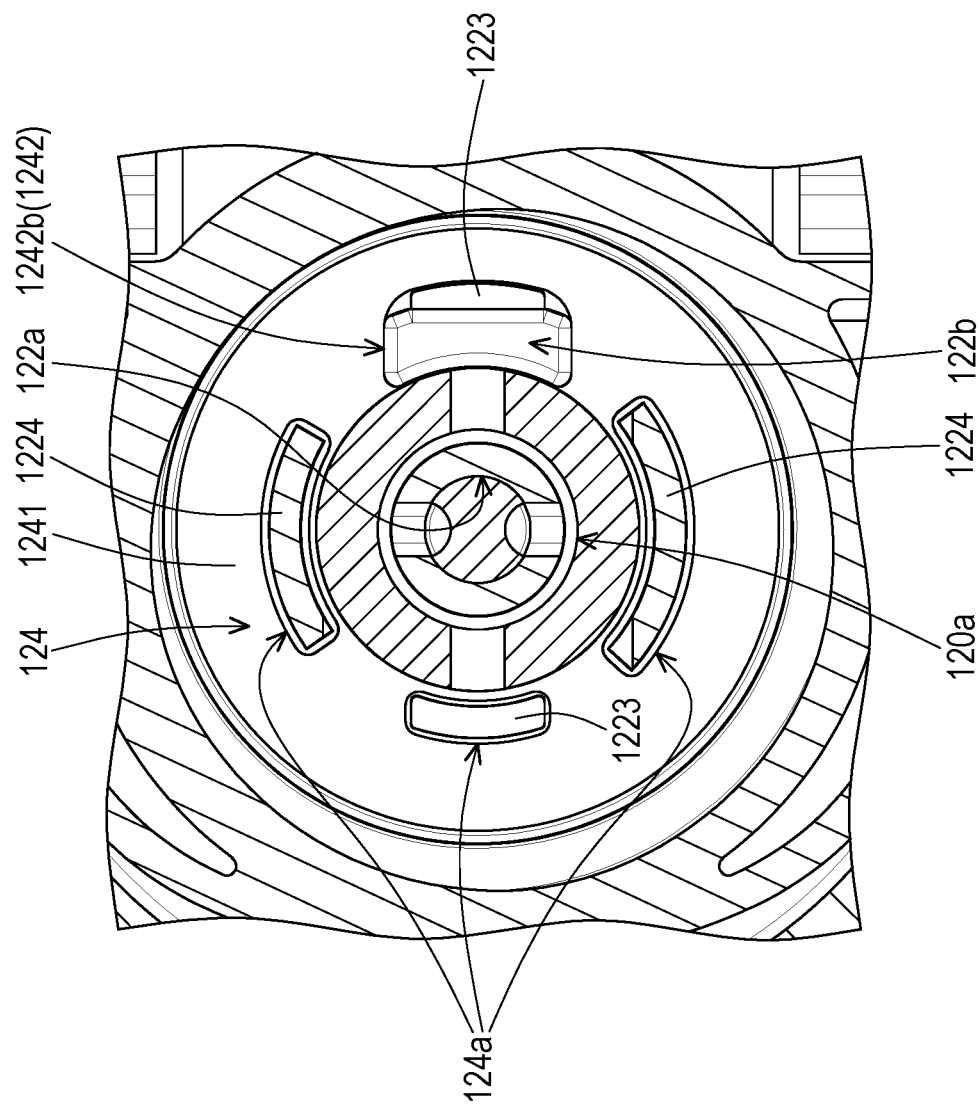
FIG. 11 shows the partial structure of the bottle cap component and the sealing and flow guiding component of FIG. 6.

FIG. 9 shows the partial structure of the vehicle-mounted air compressor and the tire sealant holding bottle of FIG. 1. FIG. 10 shows the partial structure of the vehicle-mounted air compressor and the tire sealant holding bottle of FIG. 1. FIG. 11 shows the partial structure of the bottle cap component and the sealing and flow guiding component of FIG. 6. Please refer to FIG. 9 to FIG. 11, more specifically, in the present embodiment, a flow guiding channel 120*a* is formed in the gap between the sealing and flow guiding component 124 and the bottle cap component 122, and the flow guiding channel 120*a* is connected between the air inlet hole 1242*a* and the air outlet hole 1242*b*. The high-pressure airflow from the air compressor main body 110 (shown in FIG. 1) may pass through the air inlet end 1221, the air inlet opening 122*a*, the flow guiding channel 120*a*, and the air inlet hole 1242*a* in sequence along a flow path P1 shown in FIG. 9 to reach the inside of the tire sealant holding bottle 50, and a tire sealant 501 inside the tire sealant holding bottle 50 may pass through the air outlet hole 1242*b*, the air outlet opening 122*b*, and the air outlet end 1222 in sequence along a flow path P2 shown in FIG. 10 with the high-pressure airflow and flow to the tire 60 (shown in FIG. 3) via the connecting pipe 130.

More specifically, the flow guiding channel 120*a* is extended in a zigzag manner as shown in FIG. 9 and FIG. 10, and the width of the flow guiding channel 120*a* (that is, the gap between the sealing and flow guiding component 124 and the bottle cap component 122) is less than the inner diameter of the air inlet opening 122*a* and the inner diameter of the air inlet hole 1242*a*. Accordingly, it may be ensured that the tire sealant having surface tension in the tire sealant holding bottle 50 does not flow to the air inlet opening 122*a* of the bottle cap component 122 via the flow guiding channel 120*a*. The width of the flow guiding channel 120*a* is, for example, 0.1 mm to 0.3 mm, but the invention is not limited thereto.

Please refer to FIG. 8. In the present embodiment, the flow guiding portion 1242 of the sealing and flow guiding component 124 includes a boss C, the air inlet hole 1242*a* is located at the top end of the boss C, and the bottom end of the boss C is adjacent to the air outlet hole 1242*b* and the sealing portion 1241. That is, the flow guiding portion 1242 of the sealing and flow guiding component 124 includes the boss C, the air inlet hole 1242*a* formed at the top end of the boss C, and the air outlet hole 1242*b* adjacent to the bottom end of the boss C. The air inlet opening 122*a* and the flow guiding channel 120*a* are located inside the boss C. When the tire sealant holding bottle 50 is engaged with the bottle cap component 122, the boss C is protruded into the tire sealant holding bottle 50 and makes the air inlet hole 1242*a* reliably face the internal space of the tire sealant holding bottle 50.

Please refer to FIG. 6 to FIG. 8. In the present embodiment, the sealing and flow guiding component 124 has a plurality of positioning slots 124*a*, and the bottle cap component 122 has two positioning ribs 1223 and two cutting edge ribs 1224. The two positioning ribs 1223 respectively pass through a positioning slot 124*a* and an air outlet hole 1242*b*, and the two cutting edge ribs 1224 respectively pass through another two positioning slots 124*a* to prevent the sealing and flow guiding component 124 from rotating relative to the bottle cap component 122. Based on the above, in the present embodiment, the tire sealant holding bottle 50 and the bottle cap component 122 are engaged with each other in a relatively rotating manner, for example, by screwing the cap. When the tire sealant holding bottle 50 and the bottle cap component 122 are rotated relative to each other during the engaging process, the positioning design of the positioning slots 124*a* and the positioning ribs 1223 may prevent the sealing and flow guiding component 124 from being twisted and deformed due to the rotation.

Moreover, during the engaging process of the tire sealant holding bottle 50 and the bottle cap component 122, the cutting edge ribs 1224 are adapted to cut the sealing film on the bottleneck 52 of the tire sealant holding bottle 50 so that the sealing and flow guiding component 124 may smoothly communicate with the internal space of the tire sealant holding bottle 50.

Please refer to FIG. 2 and FIG. 4. In the present embodiment, the vehicle-mounted air compressor 100 further includes a limiting component 140 and at least one fastening component 150 (two are shown). The limiting component 140 limits the bottle cap component 122 to the air compressor main body 110. The fastening component 150 is, for example, a screw and fastens the limiting component 140 to the air compressor main body 110. Accordingly, the user only needs to simply mount the bottle cap component 122 to the air compressor main body 110 and mount the limiting component 140 to complete the installation of the bottle cap component 122, and the user only needs to simply remove the limiting component 140 and then remove the bottle cap component 122 to complete the disassembly of the bottle cap component 122 and/or the replacement of the tire sealant holding bottle 50. More specifically, the fastening direction of the fastening component 150 is, for example, the same as the insertion direction (the direction D as shown in FIG. 2) of the air inlet end 1221 of the bottle cap component 122, and the fastening position of the fastening component 150 and the insertion position of the air inlet end 1221 of the bottle cap component 122 are both located at the same side (that is, the upper side of the air compressor main body 110) of the air compressor main body 110, so that the user may readily assemble the vehicle-mounted air compressor 100 in the same position and in the same working direction. Moreover, since the fastening direction of the fastening component 150 is the same as the insertion direction of the air inlet end 1221 of the bottle cap component 122, the air inlet end 1221 may be firmly inserted into the air compressor main body 110 by tightening the fastening component 150.

The following describes the operation process of the vehicle-mounted air compressor of the present embodiment.

Figure 12A:
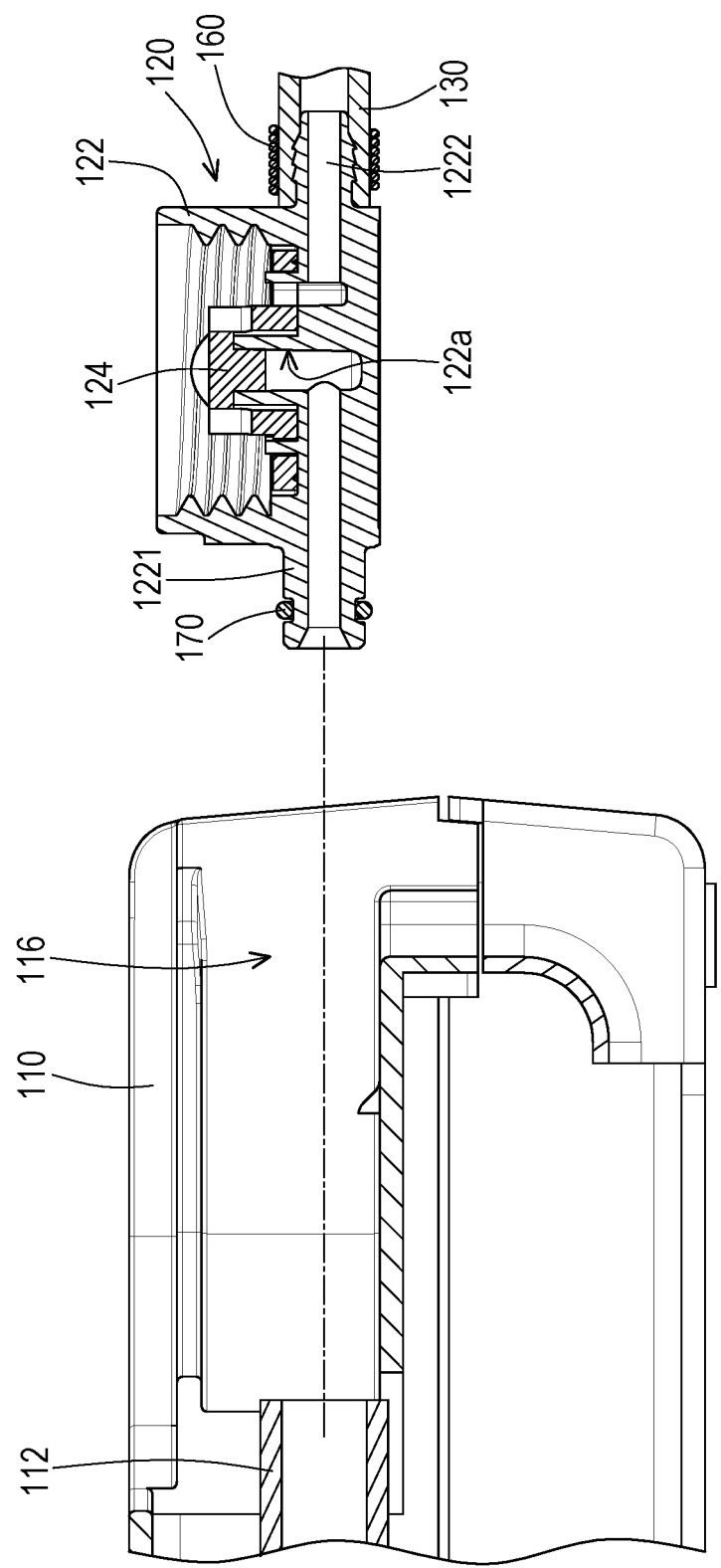
FIG. 12A to FIG. 12E are operation flowcharts of the vehicle-mounted air compressor of FIG. 1.
Figure 12B:
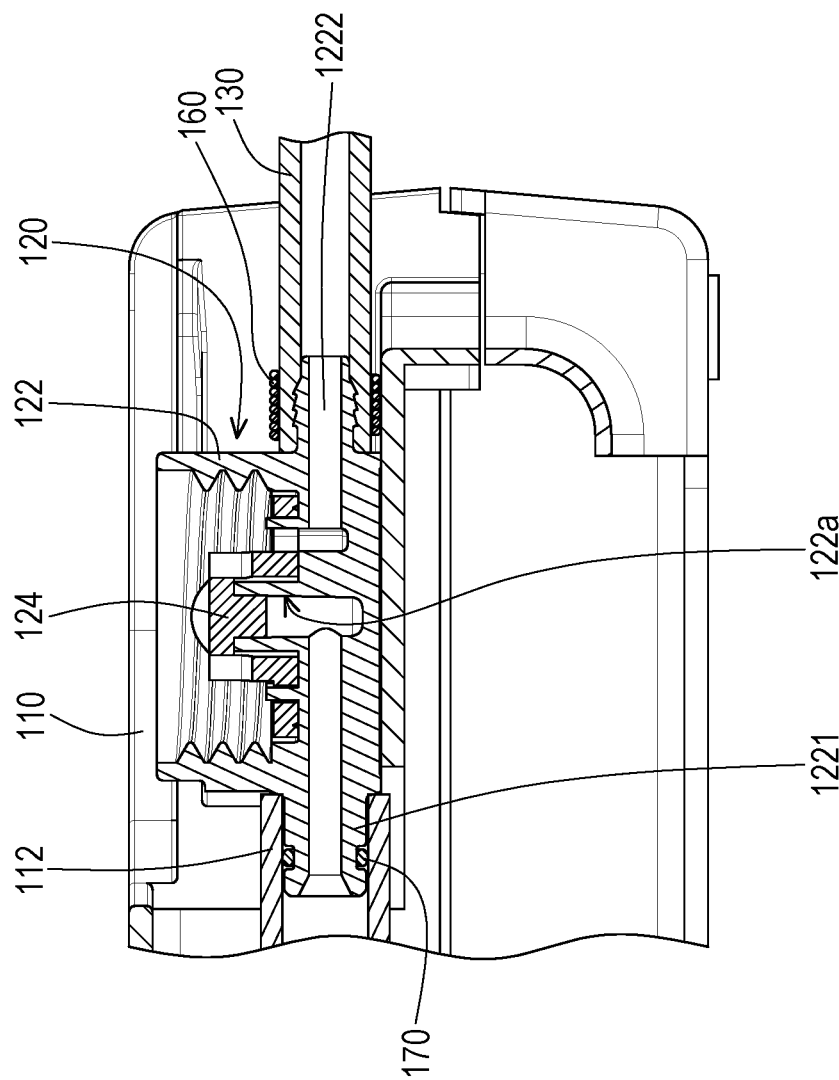

FIG. 12A to FIG. 12E are operation flowcharts of the vehicle-mounted air compressor of FIG. 1. FIG. 13A to FIG. 13C are top views of the vehicle-mounted air compressor of FIG. 12A to FIG. 12C respectively. First, as shown in FIG. 12A and FIG. 13A, the connecting pipe 130 is placed at the air outlet end 1222 of the bottle cap component 122, and the connecting pipe 130 is fastened to the air outlet end 1222 using a pipe clamp 160. Next, as shown in FIG. 12B and FIG. 13B, the bottle cap component 122 is mounted to the air compressor main body 110 via the guidance of two guiding surfaces 116 of the air compressor main body 110, and the bottle cap component 122 is positioned by two hooks 114 of the air compressor main body 110, and at the same time, the air inlet end 1221 of the bottle cap component 122 is inserted into the air outlet pipe 112 of the air compressor main body 110, so that the air outlet pipe 112 is connected to the air inlet opening 122a. The gap between the air inlet end 1221 and the air outlet pipe 112 may be sealed by a sealing ring 170 sleeved to the air inlet end 1221. Moreover, the top surface of the air compressor main body 110 has an opening 110a. As shown in FIG. 13B, the connection point between the air outlet pipe 112 and the bottle cap component 122 corresponds to the opening 110a, allowing the user to visually confirm whether the air outlet pipe 112 and the bottle cap component 122 are truly connected via the opening 110a.

Figure 12C:
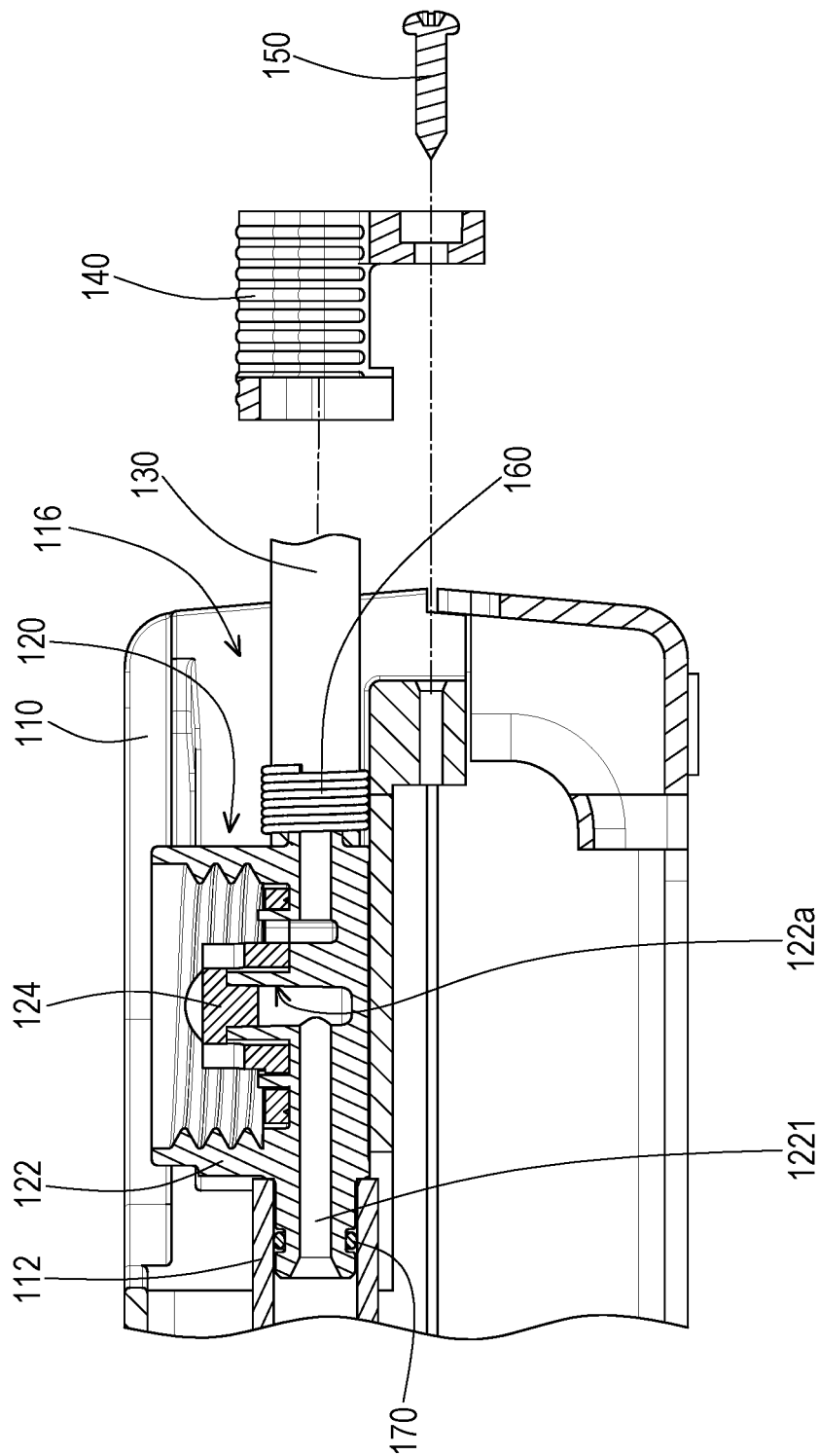
Figure 12D:
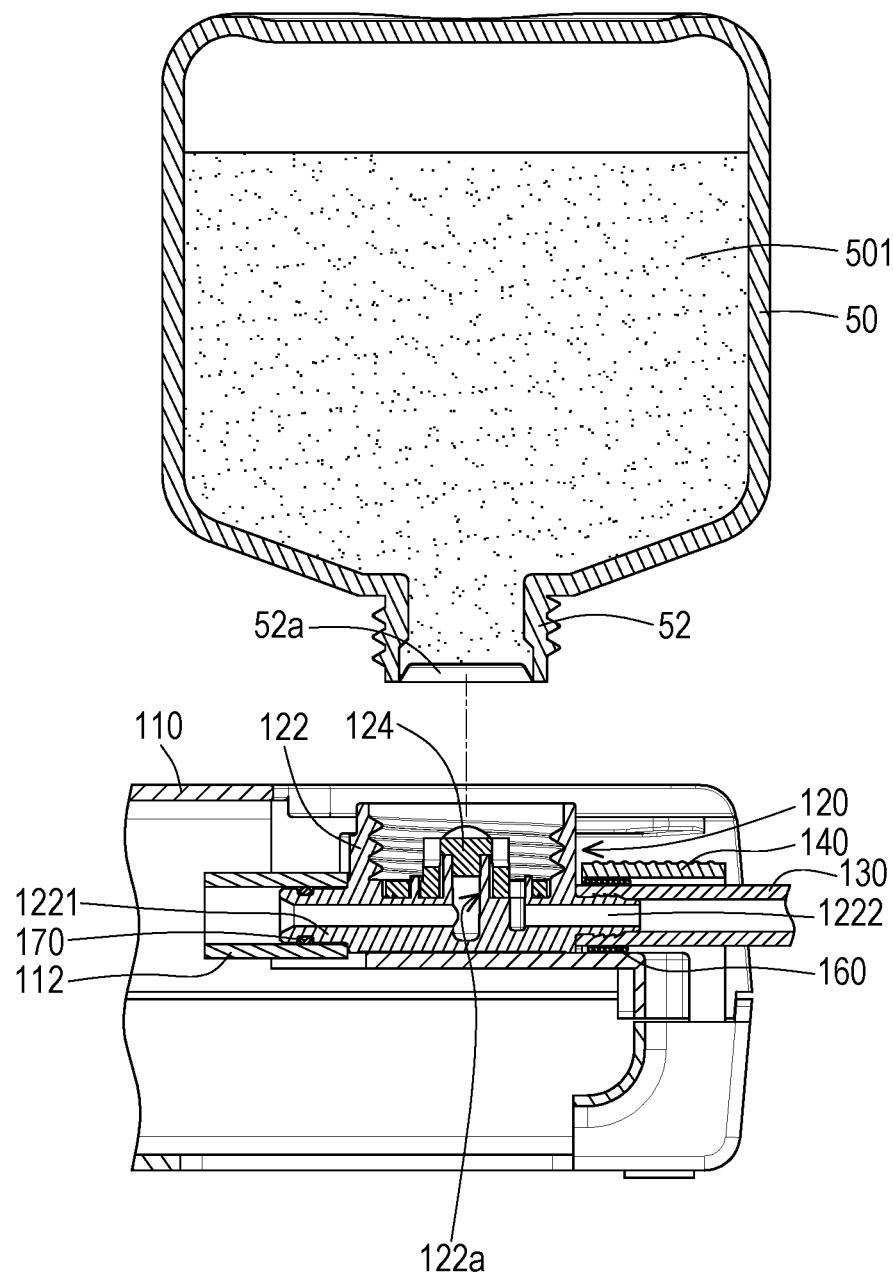
Figure 12E:
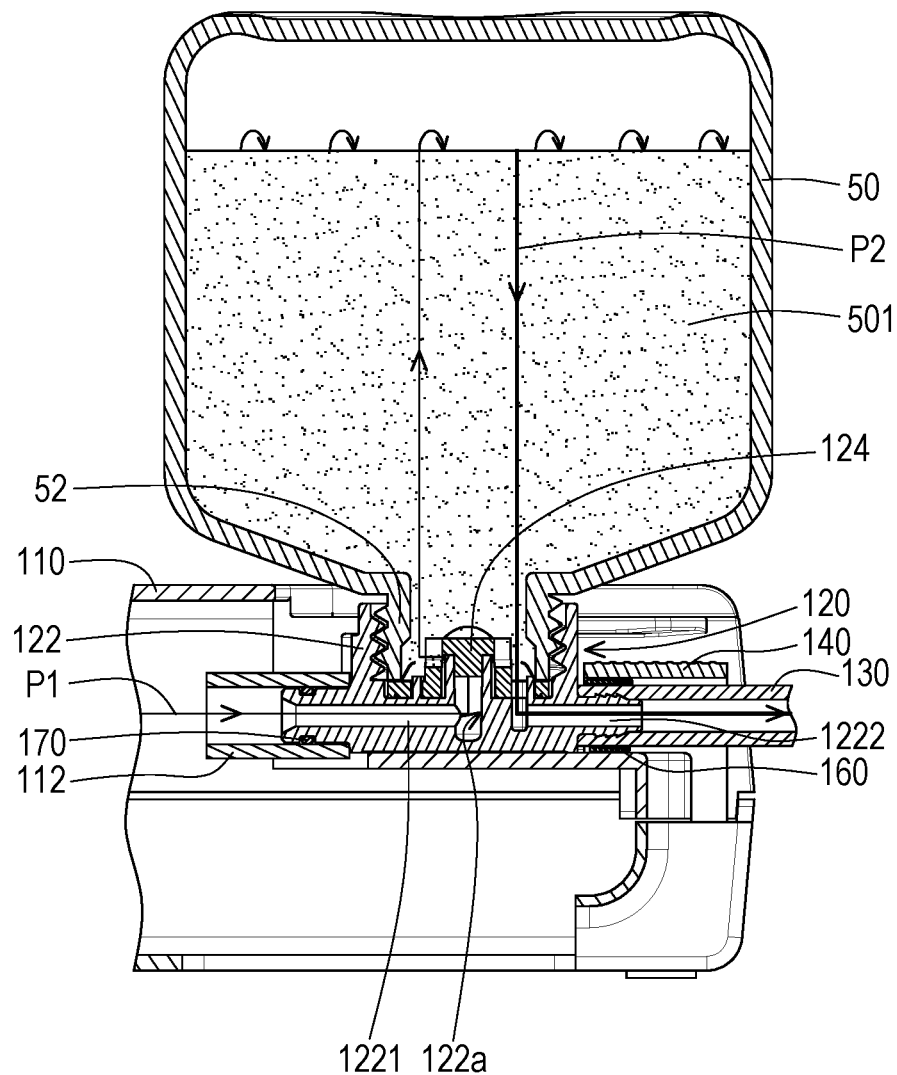
Figure 13A:
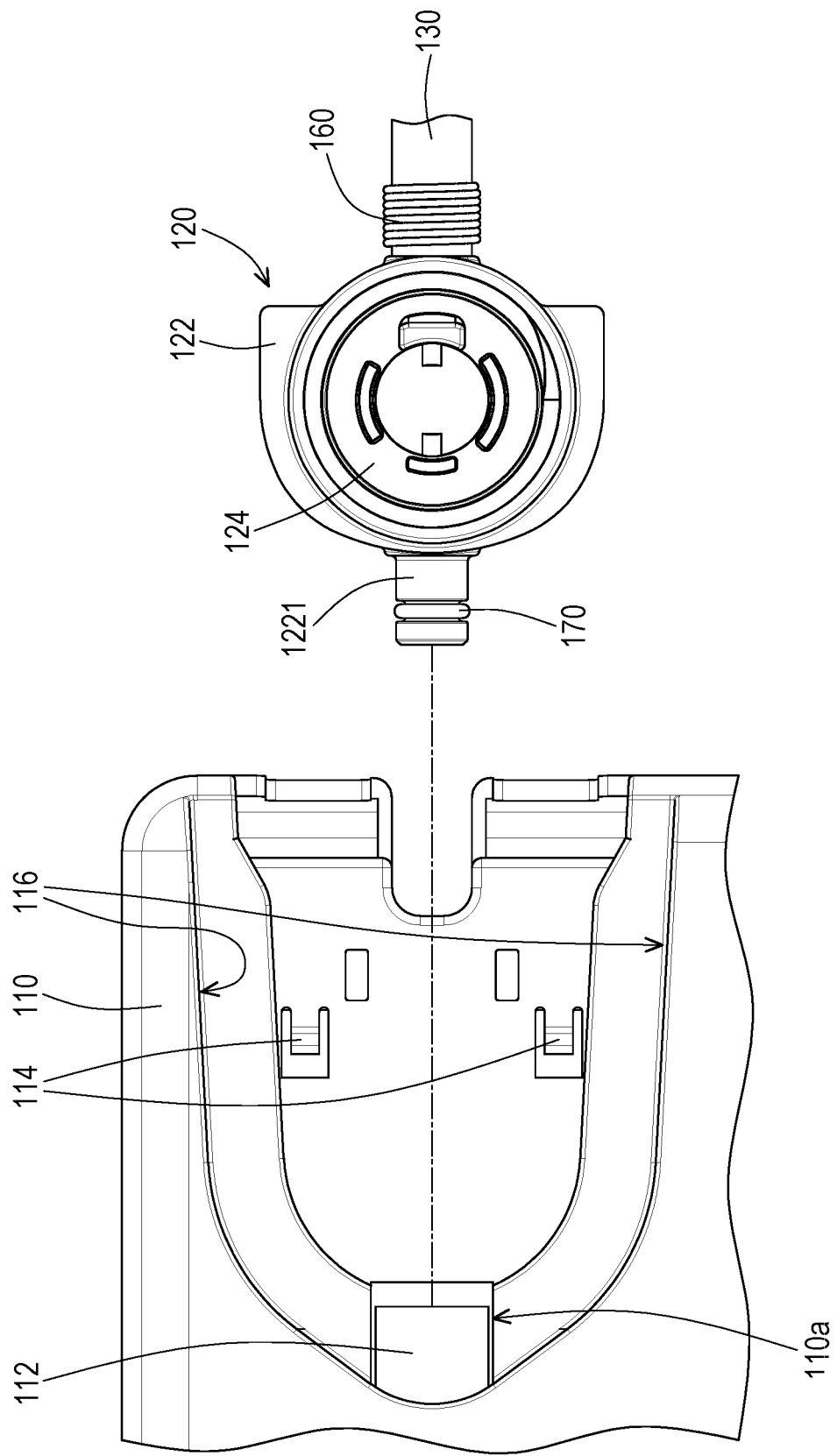
Figure 13C:
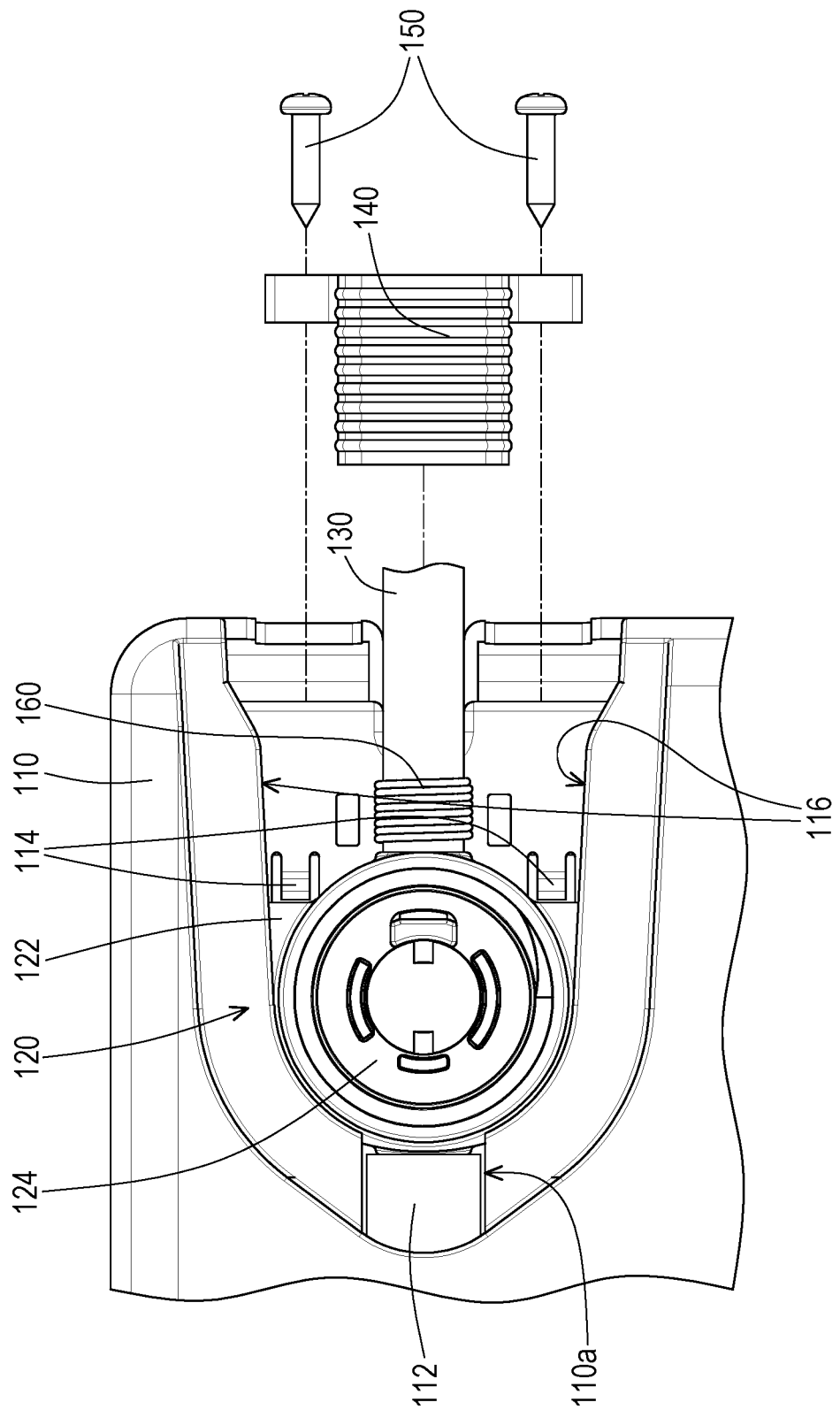

Next, as shown in FIG. 12C and FIG. 13C, the limiting component 140 is fastened to the air compressor main body 110 via the fastening component 150 to achieve the state shown in FIG. 12D, so that the limiting component 140 presses the bottle cap component 122 against the air compressor main body 110 and the limiting component 140 presses the connecting pipe 130. Next, as shown in FIG. 12D to FIG. 12E, the bottleneck 52 of the tire sealant holding bottle 50 is engaged with the bottle cap component 122. During this process, a sealing film 52a at the bottleneck 52 is cut by the cutting edge ribs 1224 (shown in FIG. 7) of the bottle cap component 122, so that the high-pressure airflow from the air compressor main body 110 may enter the tire sealant holding bottle 50 along the flow path P1 during a subsequent tire repair and inflation operation, and the tire sealant 501 in the tire sealant holding bottle 50 may leave the tire sealant holding bottle 50 along the flow path P2 with the high-pressure airflow during a subsequent tire repair and inflation operation. Lastly, as shown in FIG. 3, the connecting pipe 130 is connected to the tire 60, and the tire 60 may be repaired and inflated via the vehicle-mounted air compressor 100.

Figure 14:
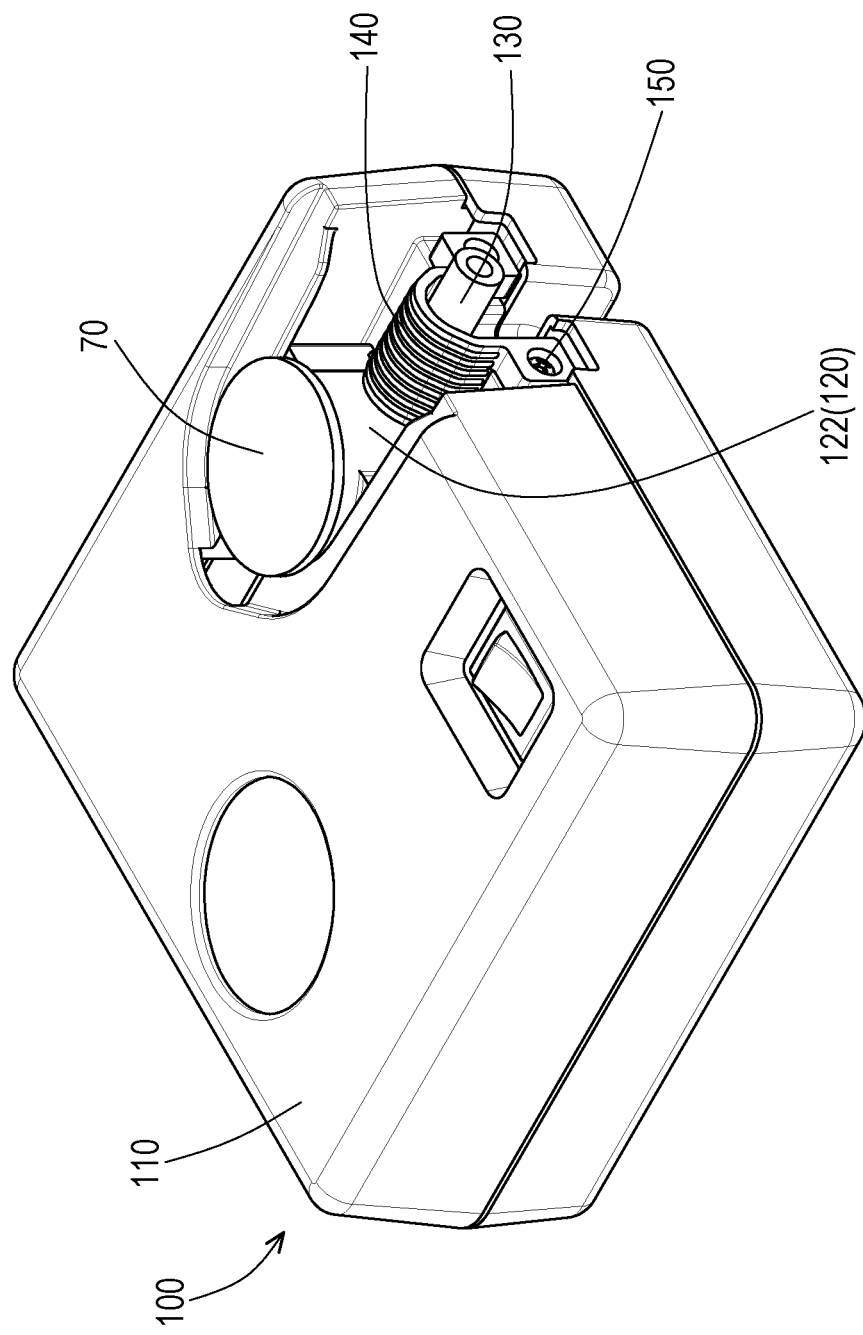
FIG. 14 shows that the tire sealant holding bottle in FIG. 1 is replaced by a cover body.
Figure 15:
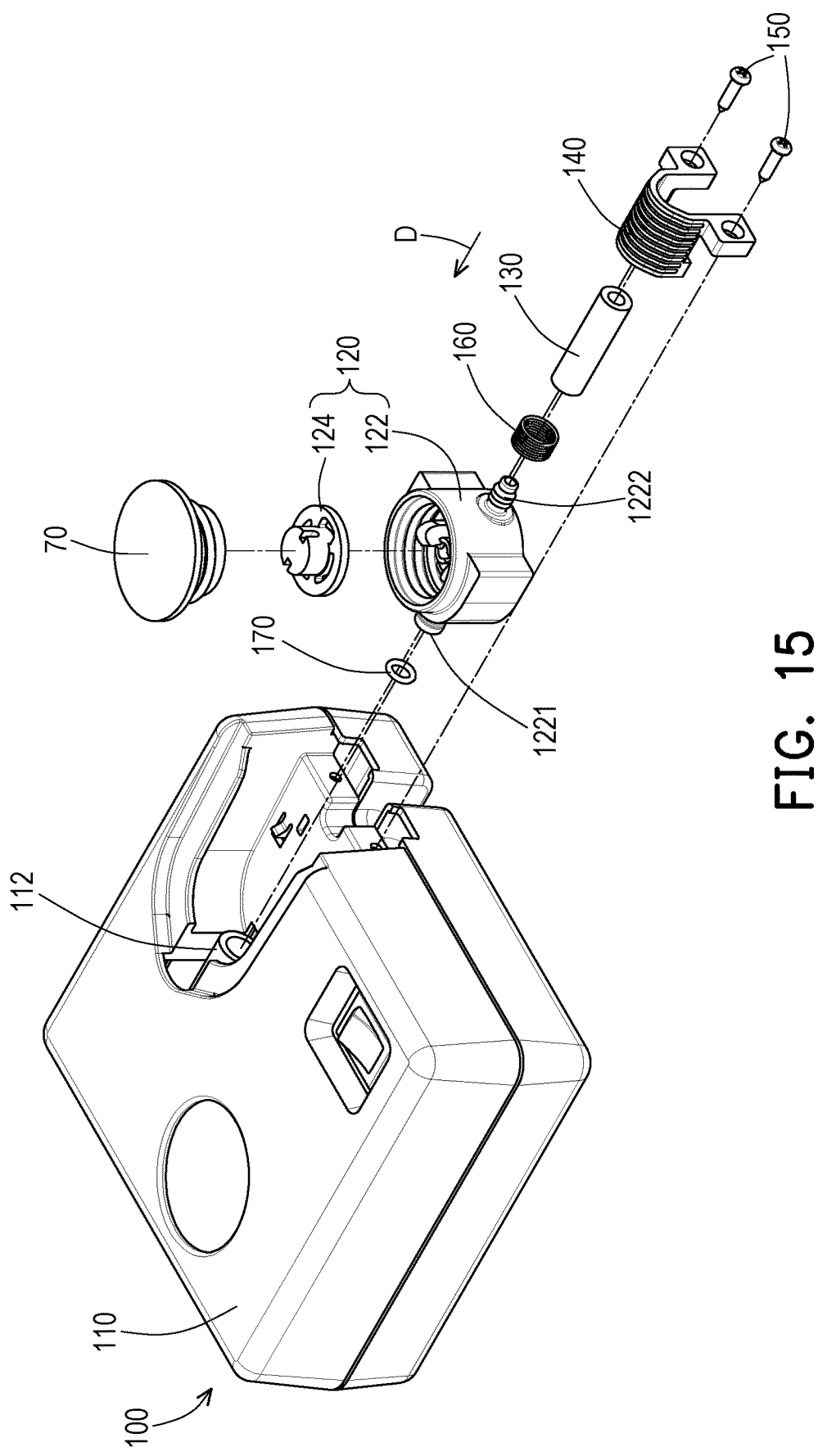
FIG. 15 shows that the tire sealant holding bottle in FIG. 2 is replaced by a cover body.
Figure 16A:
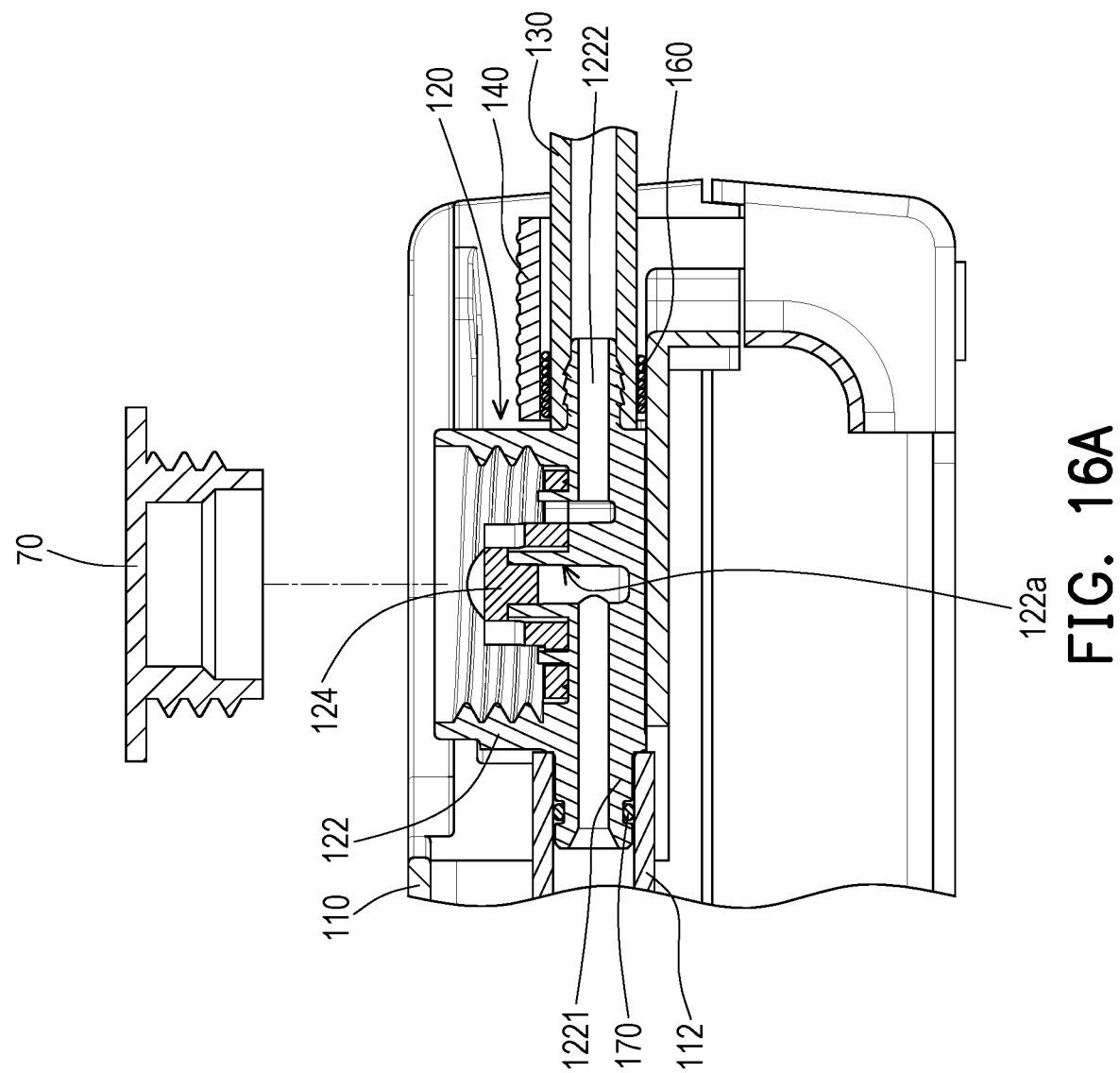
FIG. 16A shows that the tire sealant holding bottle in FIG. 12D is replaced by a cover body.
Figure 16B:
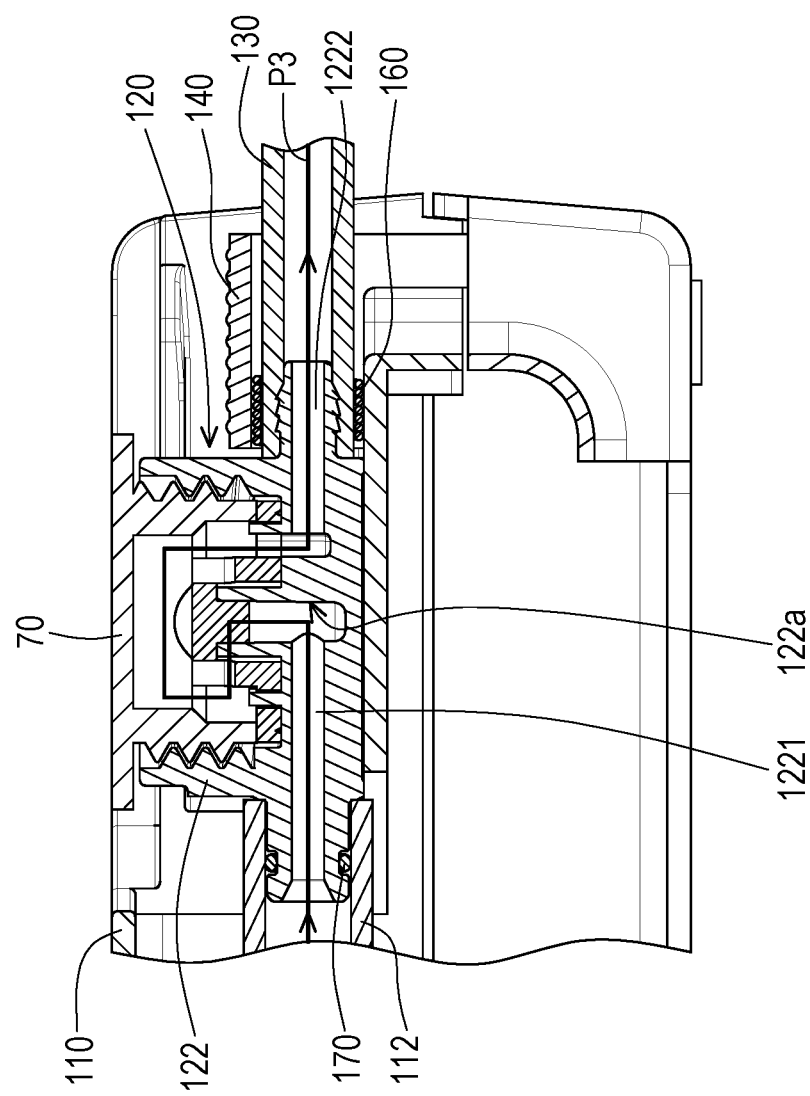
FIG. 16B shows that the tire sealant holding bottle in FIG. 12E is replaced by a cover body.

FIG. 14 shows that the tire sealant holding bottle in FIG. 1 is replaced by a cover body. FIG. 15 shows that the tire sealant holding bottle in FIG. 2 is replaced by a cover body. FIG. 16A shows that the tire sealant holding bottle in FIG. 12D is replaced by a cover body. FIG. 16B shows that the tire sealant holding bottle in FIG. 12E is replaced by a cover body. The vehicle-mounted air compressor 100 of the present embodiment may also only inflate the tire 60 without repairing the tire 60. Specifically, the tire sealant holding bottle 50 in FIG. 1, FIG. 2, FIG. 12D, and FIG. 12E may be replaced by a cover body 70 in FIG. 14, FIG. 15, FIG. 16A, and FIG. 16B. The rest of the operation process thereof is the same as the above and is not repeated herein. Since the tire sealant holding bottle 50 is not used in the manner shown in FIG. 14, FIG. 15, 16A, and FIG. 16B, after passing through the bottle cap assembly 120, the high-pressure airflow from the air compressor main body 110 directly reaches the tire for inflation, as shown in a flow path P3 of FIG. 16B.

Based on the above, in the vehicle-mounted air compressor of the invention, in addition to providing the existing sealing function via the sealing portion thereof, the sealing and flow guiding component also covers the air inlet opening of the bottle cap component via the flow guiding portion thereof. Accordingly, while the high-pressure airflow from the air compressor main body flows smoothly to the air outlet opening of the bottle cap component via the guidance of the flow guiding portion, the flow guiding portion may prevent the tire sealant in the tire sealant holding bottle from flowing to the air inlet opening of the bottle cap component. That is, in the invention, the flow guiding portion is integrally formed on the existing sealing component to cover the air inlet opening of the bottle cap component, so no additional parts are needed to achieve this object. Therefore, the vehicle-mounted air compressor and the bottle cap assembly thereof of the invention prevent the tire sealant from flowing to the air compressor main body via a simple structure, thereby reducing the difficulty of manufacturing and assembling the bottle cap assembly.

What is claimed is:

1. A vehicle-mounted air compressor, comprising:
an air compressor main body; and
a bottle cap assembly, comprising:
    a bottle cap component mounted at the air compressor main body and having an air inlet opening and an air outlet opening, wherein the bottle cap component is connected to the air compressor main body via the air inlet opening; and
    a sealing and flow guiding component disposed at the bottle cap component and comprising a sealing portion and a flow guiding portion, wherein the sealing portion surrounds the flow guiding portion, the flow guiding portion covers the air inlet opening and has at least one air inlet hole and an air outlet hole, the flow guiding portion is connected to the air inlet opening via the at least one air inlet hole and connected to the air outlet opening via the air outlet hole, and an airflow from the air compressor main body is adapted to pass through the air inlet opening, the at least one air inlet hole, the air outlet hole, and the air outlet opening in sequence, wherein a flow guiding channel is formed between the sealing and flow guiding component and the bottle cap component, and the flow guiding channel is connected between the at least one air inlet hole and the air outlet hole.

2. The vehicle-mounted air compressor of claim 1, wherein the sealing portion and the flow guiding portion are integrally formed structures.

3. The vehicle-mounted air compressor of claim 1, wherein a width of the flow guiding channel is less than an inner diameter of the air inlet opening and an inner diameter of the at least one air inlet hole.

4. The vehicle-mounted air compressor of claim 1, wherein the flow guiding channel is extended in a zigzag manner.

5. The vehicle-mounted air compressor of claim 1, wherein the flow guiding portion comprises a boss, the at least one air inlet hole is located at a top end of the boss, and a bottom end of the boss is adjacent to the air outlet hole and the sealing portion.

6. The vehicle-mounted air compressor of claim 1, wherein the sealing and flow guiding component has at least one positioning slot, the bottle cap component has at least one positioning rib, and the at least one positioning rib passes through the at least one positioning slot to prevent the sealing and flow guiding component from rotating relative to the bottle cap component.

7. The vehicle-mounted air compressor of claim 1, wherein the bottle cap component is adapted to engage with a bottleneck of a tire sealant holding bottle, so that the sealing portion is compressed between the bottle cap component and the bottleneck of the tire sealant holding bottle, and the air inlet hole and the air outlet hole are connected to an internal space of the tire sealant holding bottle.

8. The vehicle-mounted air compressor of claim 7, wherein the bottle cap component has at least one cutting edge rib, and the at least one cutting edge rib is adapted to cut a sealing film on the bottleneck of the tire sealant holding bottle.

9. The vehicle-mounted air compressor of claim 1, further comprising a limiting component and at least one fastening component, wherein the limiting component limits the bottle cap component to the air compressor main body, and the at least one fastening component fastens the limiting component to the air compressor main body.

10. The vehicle-mounted air compressor of claim 1, wherein the air compressor main body has an air outlet pipe, the air outlet pipe is connected to the bottle cap component to be connected to the air inlet opening, there is an opening at a top surface of the air compressor main body, and a connection point between the air outlet pipe and the bottle cap component corresponds to the opening.

11. A bottle cap assembly, adapted for a vehicle-mounted air compressor, comprising:

a bottle cap component mounted at an air compressor main body of the vehicle-mounted air compressor and having an air inlet opening and an air outlet opening, wherein the bottle cap component is connected to the air compressor main body via the air inlet opening; and a sealing and flow guiding component disposed at the bottle cap component and comprising a sealing portion and a flow guiding portion, wherein the sealing portion surrounds the flow guiding portion, the flow guiding portion covers the air inlet opening and has at least one air inlet hole and an air outlet hole, the flow guiding portion is connected to the air inlet opening via the at least one air inlet hole and connected to the air outlet opening via the air outlet hole, and an airflow from the air compressor main body is adapted to pass through the air inlet opening, the at least one air inlet hole, the air outlet hole, and the air outlet opening in sequence, wherein a flow guiding channel is formed between the sealing and flow guiding component and the bottle cap component, and the flow guiding channel is connected between the at least one air inlet hole and the air outlet hole.

12. The bottle cap assembly of claim 11, wherein the sealing portion and the flow guiding portion are integrally formed structures.

13. The bottle cap assembly of claim 11, wherein a width of the flow guiding channel is less than an inner diameter of the air inlet opening and an inner diameter of the at least one air inlet hole.

14. The bottle cap assembly of claim 11, wherein the flow guiding channel is extended in a zigzag manner.

15. The bottle cap assembly of claim 11, wherein the flow guiding portion comprises a boss, the at least one air inlet hole is located at a top end of the boss, and a bottom end of the boss is adjacent to the air outlet hole and the sealing portion.

16. The bottle cap assembly of claim 11, wherein the sealing and flow guiding component has at least one positioning slot, the bottle cap component has at least one positioning rib, and the at least one positioning rib passes through the at least one positioning slot to prevent the sealing and flow guiding component from rotating relative to the bottle cap component.

17. The bottle cap assembly of claim 11, wherein the bottle cap component is adapted to engage with a bottleneck of a tire sealant holding bottle, so that the sealing portion is compressed between the bottle cap component and the bottleneck of the tire sealant holding bottle, and the air inlet hole and the air outlet hole are connected to an internal space of the tire sealant holding bottle.

18. The bottle cap assembly of claim 17, wherein the bottle cap component has at least one cutting edge rib, and the at least one cutting edge rib is adapted to cut a sealing film on the bottleneck of the tire sealant holding bottle.

\* \* \* \* \*